United States Patent
Li et al.

(10) Patent No.: US 10,447,710 B1
(45) Date of Patent: Oct. 15, 2019

(54) SELF-SHIELDING DYNAMIC NETWORK ARCHITECTURE

(71) Applicant: Cryptonite, LLC, Rockville, MD (US)

(72) Inventors: Jason Li, Potomac, MD (US); Justin Yackoski, Gaithersburg, MD (US); Brian Kambach, Rockville, MD (US); Renato Levy, North Potomac, MD (US); Nicholas Evancich, Clarksburg, MD (US)

(73) Assignee: Cryptonite, LLC, Rockville, MD (US)

( * ) Notice: Subject to any disclaimer, the term of this patent is extended or adjusted under 35 U.S.C. 154(b) by 456 days.

(21) Appl. No.: 14/729,521

(22) Filed: Jun. 3, 2015

Related U.S. Application Data

(60) Provisional application No. 62/007,238, filed on Jun. 3, 2014.

(51) Int. Cl.
*H04L 29/06* (2006.01)

(52) U.S. Cl.
CPC ...... *H04L 63/1416* (2013.01); *H04L 63/0281* (2013.01); *H04L 63/0876* (2013.01); *H04L 63/1425* (2013.01); *H04L 63/20* (2013.01)

(58) Field of Classification Search
CPC . H04L 63/1416; H04L 63/20; H04L 63/0281; H04L 63/0876; H04L 63/1425
See application file for complete search history.

(56) References Cited

U.S. PATENT DOCUMENTS

| | | | | |
|---|---|---|---|---|
| 2008/0222734 | A1* | 9/2008 | Redlich | G06F 21/577 726/26 |
| 2008/0307487 | A1* | 12/2008 | Choyi | H04L 63/20 726/1 |
| 2009/0265414 | A1* | 10/2009 | Bryan | H04L 67/104 709/202 |
| 2014/0280801 | A1* | 9/2014 | Cardona | H04L 47/127 709/221 |

OTHER PUBLICATIONS

Yackoski, et al. "Applying Self-shielding Dynamics to the Network Architecture." Intelligent Automation, Inc., Rockville, MD. Jajodia, Sushil, et al., eds. Moving Target Defense II: Application of Game Theory and Adversarial Modeling. vol. 100. Springer Science & Business Media, 2013.*

* cited by examiner

*Primary Examiner* — Fatoumata Traore
(74) *Attorney, Agent, or Firm* — Krieg DeVault LLP; Daniel Tychonievich

(57) ABSTRACT

A shielding is provided to prevent attacks on network architecture or reduce the impact thereof. The system reconfigures the network differently for each user, operating system, and host and the configuration changes as time passes. The system can use dynamic redirection to create a reconfigurable network, and include intermediary nodes to dynamically reconfigure the network infrastructure for all traffic.

17 Claims, 19 Drawing Sheets

FIG. 18

SELF-SHIELDING DYNAMIC NETWORK ARCHITECTURE

This Application claims the benefit of U.S. Provisional Application Ser. No. 62/007,238 filed on Jun. 3, 2014, the complete disclosure of which is hereby expressly incorporated herein by reference.

This invention was made with Government support under contract number FA8750-11-C-0179 awarded by the Air Force Research Laboratory. The Government has certain rights in the invention.

BACKGROUND OF THE INVENTION

The subject invention relates to a shielding to prevent attacks on a network architecture, and in particular, to a self-shielding system to prevent attacks on a network or reduce their impact and spreading within the network while still providing user's access to the services.

To penetrate and dominate networks, hackers initially obtain a foothold on a single machine in the network either by addressing a vulnerability on the Operating System ("OS") or by social engineering. This process is difficult to avoid, because of the vast number of targets of opportunity.

Once hackers are able to execute code in one machine, the hacker attempts to escalate rights, which is finding a way to execute with higher privileges than the original break through, which normally is a low privilege entry. Once they are able to execute at higher privilege, the attacker attempts to scout the machine for accounts that would provide such privileges without hacking through OS vulnerabilities, since these vectors can be closed at any moment. With the knowledge of valid accounts, possibly with administrator rights, hackers place a "sniffer" in the network to observe and scout for the next target. A sniffer is a piece of code that "listens" to all packets and stores statistics about the traffic it observes.

Based on the data obtained, the hacker can now determine which hosts in the network are likely targets to spread the infection. The decision is often to find servers that may have interesting information (credit cards or proprietary info) or to hosts that have access to these servers. Once a new target is known, the hacker can find ways to take control of the valued target without calling much attention to itself. Without the ability to understand the network, hackers are limited to spread around blindly, which make them easy targets for security systems and protocols.

The static nature of computer networks allows attackers to gather intelligence, perform planning, and then execute attacks at will. Further, once an attacker has gained access to a host within an enclave, there is little to stop a determined attacker from mapping out and spreading to other hosts and services within the enclave.

Various types of malicious behaviors are difficult, if not impossible, to prevent using static networks and detection-based techniques. Malicious behaviors typically require careful analysis to weed out from legitimate behaviors, making the gradual collection of information about a static network feasible.

Although an enclave typically has a heavily secured perimeter firewall that performs various scanning tasks to protect the network from outside attackers, in practice such a firewall can and will be avoided by attackers. With the shift in the motivation of attackers away from notoriety and curiosity towards financial gain and state-sponsored espionage, a specific "zero-day" vulnerability or virus can be reserved specifically for use in a given attack. It is therefore not prudent to rely solely on the hope that a firewall processing millions of packets every minute can perform the analysis needed to meaningfully detect malware that exploits a previously unknown vulnerability. Even if this were the case, a user with direct access to a host in the enclave can be deceived into directly infecting that host, completely bypassing any perimeter-based detection.

Once an attacker breaches the enclave, spreading further within the enclave is significantly easier than gaining the initial foothold. The entire enclave can thus be potentially exposed via software vulnerability or an ill-informed act by a user. When an attacker compromises a single host, one should assume that the malicious software has compromised the host's OS and so can monitor all information sent to and from that host and the network. The compromised host can then easily learn the IP addresses of important hosts, record all usernames and passwords observed, misuse the user's smartcard-based credentials, hijack connections, etc.

As a result of these issues, there is disappointingly little to effectively stop an attack from spreading once inside the enclave. Further, there is always a risk that a determined attacker may use a combination of stolen credentials, knowledge of the detection system's alarm thresholds, and patience to avoid any detection-based technology intended to prevent or identify attacks. In fact, if such detection systems are known to be present, this is the logical course for the attacker to take. A network therefore requires methods to reduce the effectiveness of malicious behaviors in all aspects of an attack including network mapping, attack planning, automated attacks, command and control, long-term advanced persistent threats, etc.

The fact that hackers have an unlimited time frame to study the networks that they are attacking, is called the asymmetry of a network attack. An object of the invention is to deny this asymmetry. By fundamentally changing the nature of the network to make the network dynamic, many classes of attacks can be prevented, or their impacts and spread can be reduced and limited. To secure the enclave in the presence of these attack vectors, an object of the invention is to manage the competing goals of simultaneously securing the host's operating system from the network while providing the user access to needed services.

SUMMARY OF THE INVENTION

In one embodiment of the invention, a system is provided to reconfigure a network differently for each user, OS, and host and to make the configuration change as time passes. The system can use dynamic redirection to create a reconfigurable network, and includes intermediary nodes to dynamically reconfigure the network infrastructure for all traffic.

The DNS response is modified to provide dynamic mapping between real IP and re-directed IP, and the actual form of modification of the DNS response to provide dynamic mapping between real IP and re-directed IP is novel. The system uses ports, as well as IPs, in the redirection process guided by a hypervisor in the intermediate node. The system uses cryptographically imbedded states for network redirection inside the larger IP address.

In one embodiment, the system includes the process of using the gateway proxy node to interface legacy network routing in the dynamically reconfigured routing. The system also utilizes a process of interfacing the dynamical network with standard network security devices, such as but not limited to IPS.

Another aspect of the invention is that one embodiment includes a process of interfacing the standard network control tools (such as Microsoft's active directory) to the dynamic control of the network. Endpoint is used for filtering the service available based on user credential uniquely tied with routing information, and the validation of user credentials is at the client endpoint. The system includes policies to control the specific connections allowed at the client level, down to host, OS and user detail. Another aspect of the invention includes the process of hiding the authentication process from the attacker and use of SDNA to hide components of cloud computing avoiding users of cloud service to bleed reach outside their designated space.

BRIEF DESCRIPTION OF THE DRAWINGS

The above-mentioned and other features and objects of this invention and the manner of obtaining them will become more apparent and the invention itself will be better understood by reference to the following description of embodiments of the present invention taken in conjunction with the accompanying drawings, wherein:

FIG. 18 is an exemplary screen shot showing GUI-Network Analysis;

Figure 1:
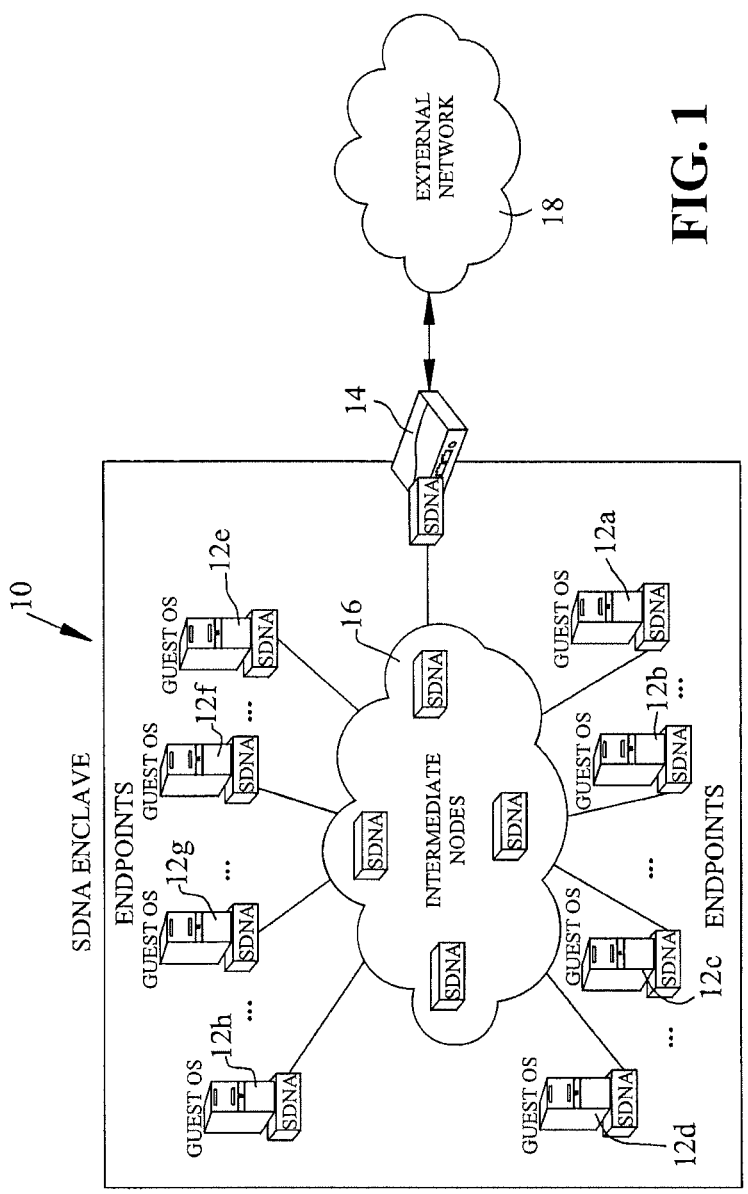
FIG. 1 is a schematic diagram of an overall network architecture including a self-shielding dynamic architecture ("SDNA")

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates embodiments of the invention, and such exemplifications are not to be construed as limiting the scope of the invention in any manner.

DETAILED DESCRIPTION OF EMBODIMENTS OF THE INVENTION

For the purposes of promoting an understanding of the principles of the invention, reference will now be made to the embodiments illustrated in the drawings, which are described below. It will nevertheless be understood that no limitation of the scope of the invention is thereby intended. The invention includes any alterations and further modifications in the illustrated devices and described methods and further applications of the principles of the invention, which would normally occur to one skilled in the art to which the invention relates.

The subject invention can be considered as a self-shielding dynamic network architecture ("SDNA") and works by denying an attacker the ability to understand the network topology once the hacker places the sniffer, hence leaving the attacker no resource but to promote a blind attack. This is accomplished by modifying the manner in which communications happen inside the network. In common networks, computers receive an IP that identifies it for network connections. In order to reach this machine other hosts would produce a packet with two IPs, the origin and the IP of the machine they are trying to reach. Hackers identify the interesting targets, by listening to these packets and verifying how many machines are looking for services form an IP. For example, if many machines in the network are reaching for one server on the same network at a given port, it is very likely that this server has some kind of intranet installed, and in this case interesting company information maybe hosted there.

SDNA changes the manner in which these network access are performed by modifying the manner in which network requests are performed, in a stealth process that makes this re-routing invisible for the host machine. SDNA assigns for each user, at each session, on each OS, for each host a custom non routable IP. When the machine reaches to the network looking for a server, SDNA will unique identify the user and provide it with just the amount of network information that they are entitled to see. This defeats most of the sniffer capability, since now the attacker can only visualize a small "cut" of what the network is. On top of that, the IP addresses that SDNA exposes as servers/targets for the computer to reach are not actual routable IPs of these machines but actually virtual addresses that need to be converted to the real ones by intermediary nodes. This indirection has two purposes, first it denies the attacker the ability to make inferences about the network (i.e. one server is on this sub-network, maybe other servers are in this sub-network too!), second it denies the ability of the attacker to understand the network topology and its defenses by means of exploring and testing with malformed packets.

The use of intermediary nodes is very unique for SDNA and allows the creation of a dynamic network, in which the network changes for every user, every time they log in, providing the would be attacker a very chaotic environment to study. The intermediate node cannot be logged in (attackers cannot access it) and are transparent for real users. The control of the intermediate nodes can only be done through a secure protocol in the SDNA control center. With the use of intermediate nodes SDNA can almost instantly and stealthy modify the manner and the targets of packets, re-routing suspicious packet for further inspection without the origination host machine ever noticing even the existence of such protection in the network.

Even for "allowed" traffic, SDNA includes another level of protection, before reaching the target machine the request packet, reaches the server's SDNA, which matches the solicitor with its rights in the server and can quietly drop, allow and observe, or reply deny access to the solicitor, all depending on the specific policy (user/OS/host/target/service requested).

SDNA makes the creation of a very dynamic network easy and practical. SDNA provides dynamics to shift the expense to the attacker in several ways, while in the same time still allow legitimate users to perform legitimate tasks. An attacker should be forced to spend significant resources to carefully guide attacks, as any packets sent which do not correctly follow the network dynamics easily stand out as unauthorized and allow immediate blocking or alert generation. Second, attempts to probe or map the network should reveal a view of the network which is sanitized, ambiguous, and time-varying, making both attack planning and detection avoidance more difficult. Finally, the availability of services should be time-varying based on user needs and credentials, dynamically limiting the connectivity of the network to only currently necessary paths to constrain the behaviors of compromised devices or insider attacks. SDNA achieves these goals by using the following mechanisms:

Dynamic and Transparent: SDNA implements multiple dynamics mechanisms for security, including addressing and naming dynamics, indirect routing, dynamic availability for service, cryptographic dynamics, etc. By inserting a hypervisor within each network host, SDNA makes the network's appearance dynamic to observers while at the same time retaining the necessary semantics for transparency to legitimate users.

Cryptographically secure: SDNA verifies the hash of each packet with a secret key, and the key exchange between different nodes is completed through a cryptographically-secure channel on SSL. The key is dynamically generated and reset on timeout.

Concealment: By using DNS redirection, Intermediate Node forwarding, and token IP for Guest OS, SDNA prevents the endpoints from knowing each other's identity, effectively concealing the structure of the network and limiting discovery of accessible services.

Auditing: SDNA provides a user-based restrictive fine-grained policy to authenticate connection between endpoint users. This creates a strong additional barrier against a worm spread over the whole network and limits the activity of a botnet even when an endpoint inside an SDNA enclave is infected, without causing major inconvenience to the user.

Multiple Technology Integration: SDNA provide a way to integrate SDNA dynamics into a common architecture, so network administrators and existing security technologies (such as firewalls, Virtual Private Networks (VPNs), Intrusion Detection Systems (IDSs), COSYNE/ARCSYNE, etc.) can continue to understand the network through crypto-graphically verified information provided by SDNA.

SDNA also provides the following features to improve usability and user experience:

External Northbound Interface: the interface that an external program can use to get or set information for network management, monitoring, and system configuration purposes.

Administration Control Center and Graphical User Interface: the management server and visualizing tool for network configuration, set up, display of topology, monitoring of network flows, display of security status, alert events, and display of worm infection procedure, etc.

Gateway for External Network: SDNA provide a gateway to route traffic between SDNA enclave and outside non-SDNA network. The outside non-SDNA network can use either IPv4 or IPv6.

Multiple Architectures for Deployment: SDNA provides two different architectures for deployment: an embedded hardware based architecture, which separates protected OS and SDNA Entity between two hardware devices, and a hypervisor based architecture, which keeps the protected OS and SDNA Entity on the same hardware device.

There are three major types of devices, in a SDNA system:

Endpoint Node: The end user's device that contains the SDNA Entity and the Guest OS protected by SDNA.

Intermediate Node: The SDNA Entity to redirect traffic between Endpoints or between Endpoint and Gateway. In a SDNA enclave, all traffic between two Endpoints and Gateways has to be redirected by at least one Intermediate Node.

Gateway Node: The SDNA Entity which connects an SDNA enclave to external non-SDNA networks. The external non-SDNA networks can use either IPv6 or IPv4. The SDNA Gateway can be integrated with some other technologies (like ARCSYNE, COSYNE, etc.) to increase the security of the whole system.

As shown in FIG. 1, inside a SDNA enclave generally indicated as 10, the Endpoints 12 *a-h* and Gateway 14 can only connect to each other via an Intermediate Node 16. The SDNA Entity on Intermediate Nodes 16 conceals the two connected points 12 *a-h* from each other using re-written pseudo IPs, so the peers cannot discover each other's identities. The SDNA Entity on an Endpoint conceals the Intermediate Node's real IP from the protected Guest OS by use of a token IP, so the Guest OS cannot gather the identity information of its neighbor Intermediate Node, even when it is infected. The SDNA Entity on Gateway performs IP mapping between an external network 18 and an SDNA enclave, so it conceals the identities inside an SDNA enclave from the external network, while letting the nodes inside the SDNA enclave reach or be reached by an external network (if policy allows). With this architecture, SDNA system can effectively conceal the structure of the network, and limit discovery of accessible services from either an attacker in an external network or a botnet inside the SDNA enclave.

SDNA allows the network hardware present in the enclave 10 to be configured to provide additional security. For switches, managed switches are configured to only allow communication between Intermediate Nodes 16 and non-Intermediate Nodes. Direct communication among Endpoint 12 *a-h* and/or Gateway 14 nodes should be blocked on a per-port basis by the switch's configuration. Remote management of the switch over the IP network should be disabled for maximum security.

The SDNA network architecture allows Endpoints 12 *a-h* to be directly connected to their Intermediate Nodes 16. Since Endpoints 12 *a-h* only send data to Intermediate Nodes 16, their required routing knowledge is extremely limited. Only the set of Intermediate Nodes 16 is known at each Endpoint 12 *a-h*. Intermediate Nodes 16 need a route to each Endpoint 12 *a-h*, which can be accomplished via RIPng (the IPv6 version of RIP) or via static configuration. With a properly configured switch, it is possible to achieve the intended effect of each Intermediate Node 16 knowing all Endpoints 12 *a-h* and Endpoints 12 *a-h* only knowing the presence of Intermediate Nodes 16 based on the routing topology.

Figure 2:
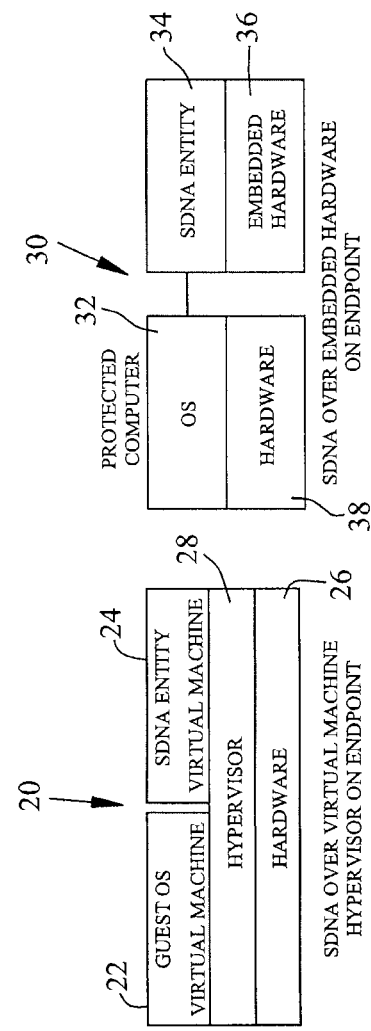
FIG. 2A is a schematic diagram depicting SDNA over virtual machine hypervisor on endpoint.
FIG. 2B is a schematic diagram depicting SDNA over embedded hardware endpoint.

Two solutions for SDNA Endpoint architecture include:

Hypervisor Solution 20 (FIG. 2 (*a*)): The protected machine 22 and SDNA Entity 22 are running on the same hardware device 26. The SDNA Entity 24 is running on a hypervisor 28, and the protected machine 22 is the Guest OS running above hypervisor 28. This solution is implemented using Xen hypervisor.

Embedded Hardware Solution 30 (FIG. 2 (*b*)): The protected machine 32 and SDNA Entity 34 are running on different hardware devices. The SDNA Entity is running on a standalone embedded system 36 other than a regular protected computer hardware. The protected computer 32 is physically connected to the embedded system directly 38.

For both solutions, the traffic to or from the protected machine transmits through the SDNA Entity. 24, 34

For the SDNA Intermediate Node and Gateway, there is no Guest OS present. All traffic entering and leaving the host either terminates in the SDNA Entity or is forwarded to another destination.

TABLE 1

IPv6 address space for Endpoint and Gateway Node

| Network ID | Host ID | SDNA bits |
|---|---|---|
| 48 bits or larger fef0:0000:0000: | 40 bits or less 0000:0000:22 | 40 bits 00:0000:0001 |

The SDNA dynamics in Layer 3 is introduced into the system by modifying the SDNA bits on IPv6 address. The 128 bit IPv6 address is divided as shown in Table 1.

According to current IPv6 allocation policies, each "site" is assigned an N bit subnet, making the Network ID the first N bits of the IPv6 address. N is a number typically between 48 and 56 per RFC6177. For example, 48 bits may be used. A site is analogous to an enclave and is defined as any ISP customer that may have the need for multiple addresses and/or subnets, which includes both corporate users as well as residential users. Essentially, ISPs will assign each user a /48 subnet.

The final 40 bits of each IPv6 address is used for SDNA and referred to as the "SDNA bits". This leaves 40 bits in the middle for the Host ID. In other words, each site can have 240, or almost 1.1 trillion, hosts. Thus, SDNA's use of the final 40 bits of IPv6 has no foreseeable negative impact on the amount of addresses available for a practical network. By combining the last 40 bits of both the source and destination IP address into a single logical field, each packet has 80 "SDNA bits."

On initial setup, each host in an SDNA-protected enclave is then assigned a/88 subnet and this information is provided to the Layer 3 switch by the network administrator. In other words, the network administrator simply instructs any network hardware to treat each node as if it were an entire/88 subnet instead of a single node. Thus, a host can be identified with network ID plus host ID, which is fixed 88 bits. Normal routing and MAC address resolution protocols can then be used without modification. In the case of a regular (Layer 2) switch, no switch configuration is required.

For example, Host A might be assigned fef0::2200:0:0/88, or fef0::2200:0:0 through fef0::22ff:ffff:ffff. When a packet enters the SDNA Entity from the Guest, SDNA sets the correct values for the SDNA bits. When a packet enters the SDNA Entity from the network, the SDNA bits are cryptographically verified. If the SDNA bits are correct, SDNA sets the bits to match the Guest's IP address and normal communication takes place. If they are invalid, SDNA sets the bits to match its own internal IP address to reroute them to a honeypot or other monitoring device.

The SDNA bits are calculated via a SHA-2 hash of the packet's metadata, the packet's payload, the current time, and a nonce derived from a shared key.

Two addresses within each /88 ranges are reserved. The 00:0:1 suffix (e.g. fef0::2200:0:1) is assigned to the Guest and is the default IP used to reach a given node, while the 00:0:2 suffix (e.g. fef0::2200:0:2) is assigned to the SDNA Entity. The 00:0:1 suffix is only valid and only used on the private Ethernet link between the Guest OS and the SDNA Entity. The 00:0:2 suffix is used for bootstrap SDNA connectivity over the network, however due to the network switch configuration, this IP is only visible or valid between an Intermediate Node and the Endpoint which owns that IP range.

The Intermediate Node is assigned a subnet no smaller than 72 bits (e.g. fef0::3000:0:0:2/72). A session ID is used to associate a source IP address, a destination IP address, and a destination IP port (see Table 5). Each source IP, destination IP, and destination port tuple has a unique session ID. The Host ID plus the Session ID reserves a unique IP address for each connection through an Intermediate Node. This information is saved with the secret key to verify metadata on Endpoints/Gateway, so the Endpoints/Gateway and Intermediate Node can synchronize with each other for a specific connection.

The session ID is saved in the "SDNA Key Structure". The session ID will expire and be deleted if the SDNA Key is not used for a period of time (default is 2 minutes). When a cached DNS record expires, the sender will initialize another DNS request and use a new session ID for the existing connection, the old session ID will be released with the deletion of the SDNA Key after 2 minutes.

TABLE 2

IPv6 address space for Intermediate Node

| Network ID | Host ID | Session ID | SDNA bits |
|---|---|---|---|
| 48 bits or larger fef0:0000:0000: | 24 bits 0000:30 | 16 bits 00:04 | 40 bits 00:0000:0001 |

The 16 bits of session ID plus the sending Endpoint node uniquely identifies a mapping created at the Intermediate Node, meaning each Endpoint can have at least 65536 concurrent connections to different destinations per available Intermediate Node. The session ID is randomly generated and must be unique. If the connections for that source and destination policy have ended or expired, the session ID is released for other uses.

System requirements for SDNA vary based on the method of deployment. The methods of deployment for SDNA are hypervisor-based and embedded system-based. The hypervisor-based approach relies on the Xen hypervisor software. The embedded system-based method of deployment utilizes a Silicon-on-Chip (SOC) embedded system that will interface with the guest OS via an Ethernet connection.

The hypervisor deployment method requires the use of the native hypervisor solution Xen. Xen is a hypervisor that runs directly on the user's hardware. It will then host the Guest OS and SDNA Entity concurrently. Within this SDNA protected computer Xen is installed on a Linux host OS. Fedora 19 is used as the OS for the control domain. A Xen version of 4.2.2 is required. Minimum hardware requirements to run Xen are a 64-bit x86 computer with at least 1 GB of RAM and sufficient storage space for the dom0 and whatever guests are installed. The Fedora 19 operating system recommends the minimum hardware specification of at least 1 GB of memory, 1 GHz or faster processor and at least 10 GB of free hard drive space. Fedora 19 is used in this application because it is the OS that Red Hat Linux is based on. Eventually Red Hat Linux will be the preferred operating system for SDNA over other Linux distributions because of its security and certification standards.

In one embodiment, the embedded hardware is a SOC embedded system with the following hardware specifications:

1.2 Ghz Marvell Armada CPU ARMADA 370 ARM v7 compliant
1 GB DDR3
1 GB NAND Flash
2 each 10/100/1000 Ethernet Ports
1 microSD card slot/reader
LED controlled by GPIO, reset button
external power supply The embedded system requires two (2) Ethernet ports for communication with the host machine and the other SDNA entities unless it is used as an Intermediate Node. In this case it will use only 1 Ethernet port. Unlike the hypervisor method of deployment, the embedded hardware method does not require use of Xen or any software change on the protected host. The embedded system runs a Linux kernel with Fedora 19. The embedded system interfaces with the guest machine via one Ethernet port and the rest of the network via the second Ethernet port. Opting for an ARM processor allows for a small form factor and low power consumption. This results in an overall lower cost alternative to other embedded systems.

Figure 3:
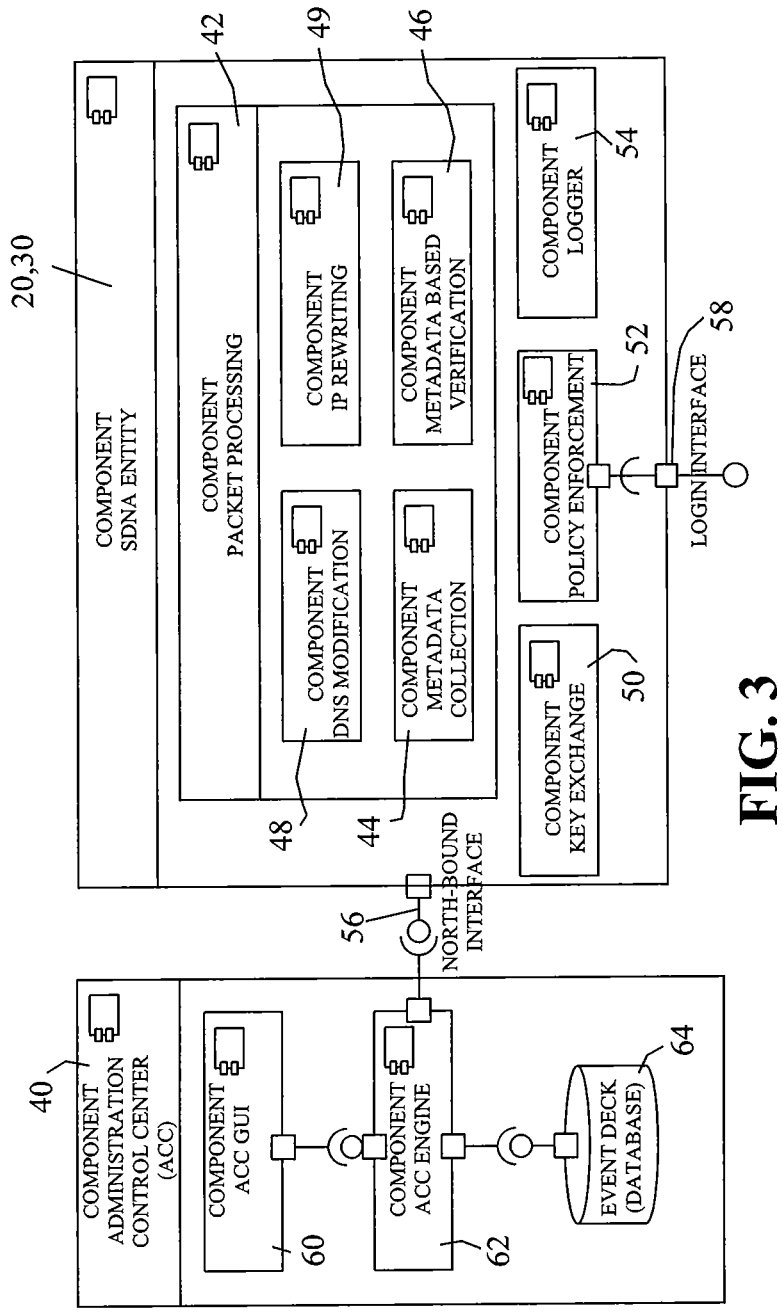
FIG. 3 is a schematic diagram of SDNA software components.

In the embodiment shown, the SDNA software contains two (2) major components as shown in FIG. 3.

SDNA Entity 20, 30: This is the major component that implements SDNA dynamics on the Endpoints 12, Intermediate Nodes 16, and SDNA Gateways 14.

Administration Control Center 40 (ACC): The software application to manage and monitor an SDNA enclave.

SDNA Entity 20, 30 contains 4 sub-components and two interfaces:

Packet Processing 42: The core component to implement SDNA dynamics on each packet. It contains 4 sub-components:

Metadata Collection 44: Calculates metadata for packet, calculating hash and encrypting the metadata using the secret key.

Metadata Based Verification 46: Verifies the metadata for an incoming packet using the secret key.

DNS Modification 48: Modifies the DNS response message; replaces the real target IP with a selected intermediate with session bits set.

IP Rewriting 49: Rewrites IP addresses in the packet to forward it to the next hop (e.g., from an Endpoint SDNA to an Intermediate Node or from an Intermediate Node to an Endpoint node). It implements the packet redirections.

Key Exchange 50: Establishes the secret key for Endpoint, Intermediate Node, and Gateway.

Policy Enforcement 52: Implements and refines the user based security policies.

Logger 54: A message logging system with multiple configurable severity levels for debugging and management.

Northbound Interface 56: An API for use by network management software to access and control SDNA system.

Login Interface 58: An interface for a user to login a SDNA Entity. Policy will be enforced on the user account.

The ACC contains 2 components:

ACC GUI: The graphical user interface 60 for management and monitoring.

ACC Engine 62: The component that integrates the network administrator (through the ACC GUI) and SDNA entities. It aggregates and stores data about SDNA entities and runtime events received from all SDNA entities an event deck database 64 and it receives management instructions from the GUI for propagation to the SDNA entities.

Third-party libraries required by SDNA are shown in Table 3. Libnetfilter_queue, libnfnetlink, and python_netfilterqueue are expected to be removed via a separate effort. Independently running software applications that the SDNA implementation interacts with (via configuration files) are listed in Table 4.

TABLE 3

Third-Party Libraries and Packages

| Name | License | on SDNA Entity | on ACC | Description |
| --- | --- | --- | --- | --- |
| Ipaddr | Apache | yes | no | An IPv4/IPv6 manipulation Python library. It is used to create/poke/manipulate IPv4 and IPv6 addresses and prefixes |
| Python Twisted | MIT | yes | no | An event-driven network programming and multiprotocol integration framework. It is used to set up connections for SDNA key exchange. |
| Python Dpkt | BSD | yes | no | A light-weight powerful interactive packet manipulation Python library to forge or decode packets of a wide number of protocols. It is used to construct packets for SDNA DNS Modification and analyze traffic in SDNA Extension software component. |
| libpcap | BSD | yes | no | A system-independent interface for user-level packet capture. libpcap provides a portable framework for low-level network monitoring |
| Pypcap | BSD | yes | no | A simplified object-oriented Python extension module for libpcap, It is used to sniffer traffic in SDNA Extension software component, |

TABLE 3-continued

Third-Party Libraries and Packages

| Name | License | on SDNA Entity | on ACC | Description |
|---|---|---|---|---|
| OpenSSL | Apache License 1.0 and 4-clause BSD License | yes | yes | A toolkit implementing the Secure Sockets Layer (SSL v2/v3) and Transport Layer Security protocols as well as a full-strength general purpose cryptography library, used to support SDNA PKI based SSL connections for SDNA key exchange and management. |
| libnetfilter_queue | GPL | yes | no | A userspace C library providing an API to packets that have been queued by the kernel packet filter. It provides access to packets matched by an iptables rule in Linux. Packets so matched can be modified then accepted, dropped, altered, or given a mark by SDNA Entity. |
| Libnfnetlink | GPL | yes | no | A low-level C library for netfilter related kernel/userspace communication. It provides a generic messaging infrastructure for nfnetlink_queue, and its respective users and/or management tools in userspace. |
| Python Netfilterqueue | LGPL | yes | no | A Python wrapper for libnetfilter_queue. |
| Json-simple | Apache | no | yes | A simple Java toolkit for JavaScript Object Notation (JSON). JSON is the format of data exchanged between ACC and SDNA Northbound Interface. ACC uses Json-simple to encode and decode JSON objects. |

TABLE 4

Software SDNA interfaces with

| Name | on SDNA Entity | on ACC | Description |
|---|---|---|---|
| XEN | yes | no | A hypervisor providing services that allow multiple computer operating systems to execute on the same computer hardware concurrently. It is used to host SDNA Entity. |
| quagga | yes | no | A network routing software suite providing implementations of Open Shortest Path First (OSPF), Routing Information Protocol (RIP), Border Gateway Protocol (BGP) and IS-IS for Unix-like platforms. |

The SDNA entities store state associated with ongoing communications, policies, IP addresses, and other network attributes in various maps. Each map stores multiple key-value pairs to allow for rapid lookups and insertions of the data to process each packet. These maps are listed in Table 5 which contains references to the sections where their use is further described.

TABLE 5

Data maps maintained by SDNA Entities

| Name | Key(s) | Value(s) | Description | See Section |
|---|---|---|---|---|
| Session Map | Src IP, Dest IP, Dest port | Key Structure (key, type, session ID, rewrite IP) | Stores the key and other session information for each session | 4.4.2.1 |
| Real-to-Token Map | Real IP | Token IP | Allows a real IP to be translated to a Token IP | 4.4.4.1 |
| Token-to-Real Map | Token IP | Real IP | Allows a Token IP to be translated to a real IP | 4.4.4.1 |
| Outgoing Gateway Map | Intermediate Node IP, session ID, external dest IP, dest port, src port | Gateway external IP, Gateway src port | Allows the Gateway to translate to the external network | 4.5.1 |
| Incoming Gateway Map | Gateway external IP, external src IP, dest port | Intermediate Node IP, session ID, external dest IP, dest port, src port | Allows the Gateway to translate from the external network | 4.5.1 |
| Host-IP Map | External Gateway IP | Internal SDNA hostname | Allows Gateway to determine the SDNA host to forward new incoming connections to. | 4.5.2 |
| Policy Map | Sender group, protocol, destination port | Action | Allows the receiving Endpoint to quickly determine the appropriate policy for a new session | 4.6.2 |

The SDNA Entity is the component that implements SDNA dynamics including IP forwarding, metadata construction, and policy auditing. It runs on the hypervisor host or embedded system, queues and processes packet from the kernel. The SDNA Entity also implements the SDNA secret key setup. The SDNA key is part of the SDNA metadata.

Before SDNA Entity forwards a packet to another SDNA Entity, it constructs an 80-bit metadata and puts it in the SDNA bits sections of the source and destination IPv6 addresses. After an SDNA Entity receives a packet, it first finds the corresponding SDNA key by checking the Session Map. If the sender is unknown or the key cannot be found, the SDNA Entity drops the packet; if the key is found, the receiver verifies the metadata in the SDNA bits sections of source and destination IPv6 addresses. If the verification fails, SDNA Entity drops the packet too; otherwise it forwards the packet to the next hop.

The metadata includes the IP header (excluding the SDNA bits and TTL) as well as the ICMP/TCP/UDP headers (excluding the checksum). The payload is included in metadata, which can avoid Man-in-the-middle attack.

The metadata, along with the current time, and the shared key are hashed using SHA-2 hash function. The first 80 bits of the hash value is saved as the SDNA bits of source and destination IPv6 addresses. The next hop node re-calculates the hash value and verifies it with last 40 bits value on source and destination IP addresses.

The current time is rounded to the nearest 60 seconds (i.e. every 0th second of a minute). This avoids replay attacks if the replay happens after the round up period range. This feature requires clocks on all SDNA nodes be synchronized within 60 seconds. Considering the timestamp of receiver and sender may cross the round-up boundary, the receiver will verify the metadata using current timestamp. If that verification fails, it will verify the metadata again using previous and next timestamp. In order to guarantee that the system works correctly with the timestamp in the metadata, all SDNA nodes must be synchronized to each other. Hence SDNA should let the synchronization traffic (on port 123) pass through without metadata verification. To accomplish this, an NTP server can be run on one or more Intermediate Nodes and all other SDNA nodes run a NTP client to synchronize to the Intermediate Node for NTP.

Within a SDNA enclave, any connection (TCP/UDP/ICMP) between two Guest OS of Endpoints requires a service redirection by an Intermediate Node as well as address and naming dynamics by DNS server and token IP mechanisms.

Figure 4:
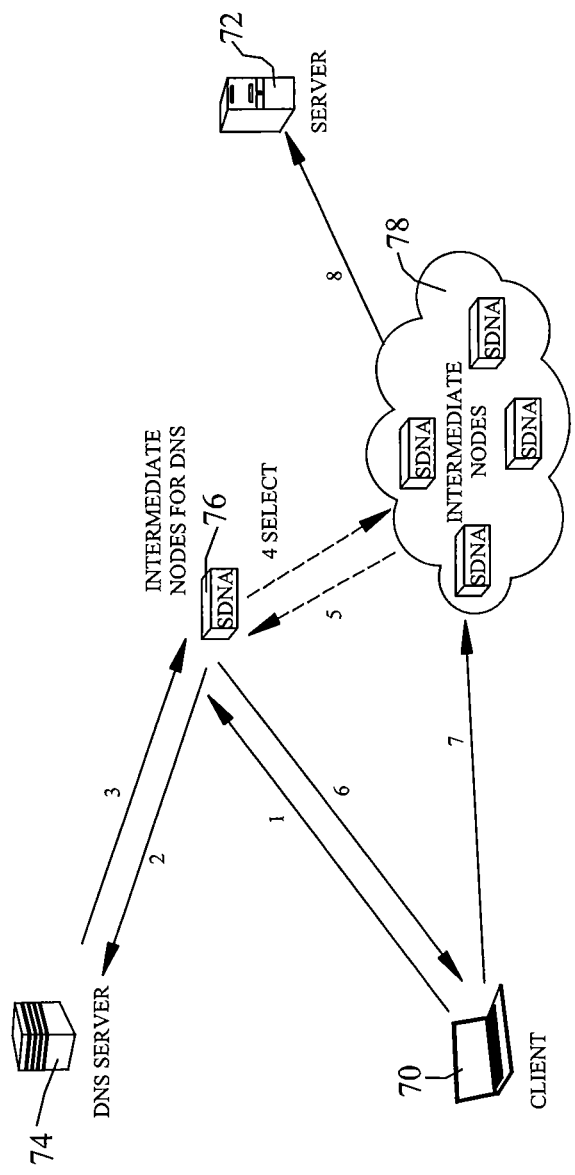
FIG. 4 is a schematic diagram of networking within an SDNA enclave.

FIG. 4 is an example of a client (Endpoint) 70 connecting to a server (Endpoint) 72 using the server's hostname. The SDNA Entity on the Client acts as the DNS server 74 for the Client Guest OS 70. The host IP address of Intermediate Node for DNS, with a pre-reserved session ID, is set as the DNS server 76 for the SDNA Entity on the Client 70. The connection establishment includes the following steps:

Client Guest OS send a DNS request to resolve Server's host name. The SDNA Entity on the Client 70 redirects the request to the Intermediate Node for DNS 76.

The Intermediate Node for DNS 76 forwards the DNS request to the DNS server 74.

The DNS server 74 generates the DNS response and sends it to the Intermediate Node for DNS 76.

The Intermediate Node for DNS 76 queues the response, selects an available Intermediate Node 76, 78 (could be itself or another Intermediate Node) and sends the selected Intermediate Node 76, 78 a message containing the IP addresses of the Client 70 and Server 72 from the DNS response message.

The selected Intermediate Node 76, 78 first reserves a unique session ID for the connection, creates two entries in the Session Map (one for each direction), then responds with a message with the session ID to the Intermediate Node for DNS 76.

The Intermediate Node for DNS 76 modifies the DNS response to replace the Server's real IP address with the IP address of the selected Intermediate Node 76, 78, with session bits set, and then directs the DNS response back to Client SDNA Entity. 70

Upon receiving the modified DNS response, the SDNA Entity on the Client 70 creates a token IP and creates a Token-to-Real Map entry (and corresponding Real-to-Token Map entry), where the real IP address is the selected intermediate IP address with session bits set. Then the Client SDNA Entity 70 replaces the Server's IP with the token IP in the DNS response and redirects the DNS response back to Client Guest OS.

The Client Guest OS uses the token IP to connect to Server 72. The SDNA Entity on the Client 70 replaces the token IP back using the intermediate IP address with session bits set, so that the packet is sent to the selected Intermediate Node. If no key exists for the connection, the client 70 will first initialize a key exchange between the Client 70, Intermediate Node 76 and Server 72.

The Intermediate Nodes 76, 78 then forward the packet to the server Endpoint 72. The SDNA Entity on the Server 72 replaces the source IP with a token IP and forwards the packet to the Server Guest OS. (Server will also create and maintain a "Token-Real IP" map).

Thus, the Guest OSs of two Endpoints can only connect to each other using the hostname or the token IP.

For compatibility with applications used by a protected host that cannot rely solely on hostname resolution or token IPs to perform their tasks (e.g., those using hardcoded IP addresses), the SDNA Entity will encapsulate, per RFC 2473, packets not destined for DNS or using a token destination IP address. Encapsulation is only performed for packets from the protected host to the SDNA Entity; non-SDNA packets originating from the network will not be encapsulated. All encapsulated packets will be sent to the Gateway node, via the DNS redirection process described above, for transmission outside the enclave.

The resulting encapsulated packet will have an IPv6 header with IP address of the SDNA Entity as the source address, the IP address of the Intermediate Node as the destination address, and the value 41 (0x29) as the "Next Header", to indicate IPv6 encapsulation. The encapsulation process will not make any changes to the content of the original packet; the original packet becomes the payload of the resultant encapsulated packet, regardless if the original packet is IPv4 or IPv6. The Gateway node will de encapsulate packets received from the SDNA network with protocol value 41, and route the packets outside the SDNA enclave, as described in Section 4.5.1. This process will proceed in reverse for responses on the same connection.

This functionality is also the means by which the local DNS server will be able to perform recursive DNS lookups to an authoritative DNS server external to the SDNA enclave.

Figure 5:
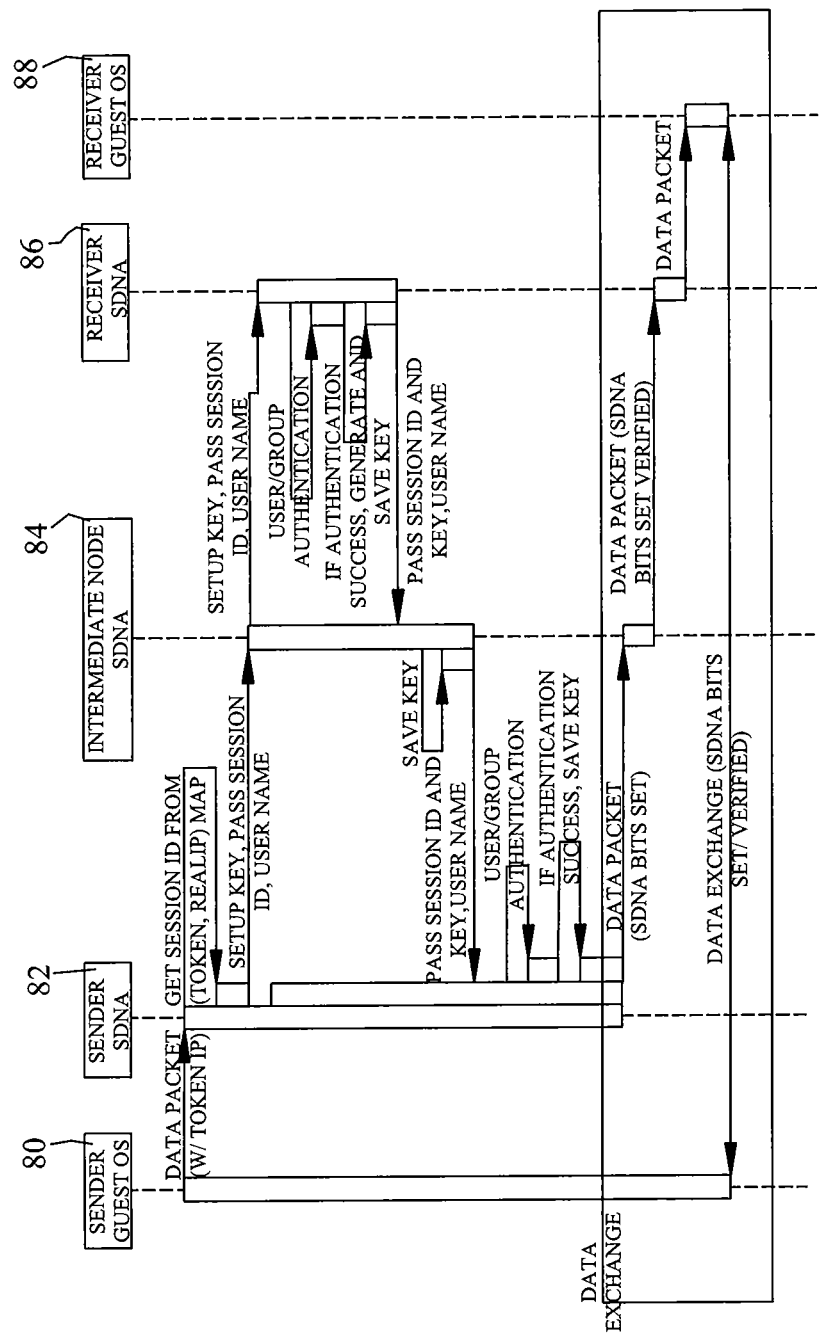
FIG. 5 is a schematic diagram showing a sequence how the SDNA key exchange across the SDNA nodes is triggered and executed.

As described above, a secret key is included in the metadata, and all SDNA nodes on the path need to be synchronized with the same SDNA key. FIG. 5 shows the sequence for how the SDNA key exchange across the SDNA nodes is triggered and executed.

Assuming that the sender is starting a connection to the receiver for which the sender has already performed the DNS lookup and received a token IP address for the receiver, the key exchange completes via the following steps:

The sender's SDNA Entity 82 receives the packet (with token IP as destination) and finds there is no key setup yet for the connection, it will initialize the key exchange: the sender's SDNA Entity first checks the "Token to Real IP" map (Table 5) to find the session ID for the connection. The session ID, which was generated by the Intermediate Node 84 during DNS query, can be obtained from the "Real IP" (Intermediate Node IP with session bits set).

The sender's SDNA Entity then sends a key setup message with the session ID to the Intermediate Node 84.

The Intermediate Node 84 forwards this key setup message to the receiver's SDNA Entity 86, according to the corresponding Session Map entry.

The receiver's SDNA Entity 86 then determines the visibility of the requested service given the sender's credentials and the receiver's policy (see Section 4.6). If the requested service is visible, the receiver's SDNA Entity generates a key and saves the key in the database using the session ID as part of the index.

The receiver's SDNA Entity 86 sends the session ID and key back to the Intermediate Node 84.

The Intermediate Node 84 then saves the key with the session ID and sends the session ID and key to the sender's SDNA Entity 82.

Finally, the sender's SDNA Entity 82 saves the key with the session ID and completes the key setup for the connection.

After the key setup, the two Endpoints 80, 88 can exchange data.

Since the key exchange happens before the metadata construction and verification can be applied, a Public Key Infrastructure (PKI)-based SSL connection is used for the whole key exchange procedure to keep it secure. The port 4433 on Intermediate Nodes and the port 4434 on Endpoint and Gateway nodes are reserved for the SSL connections. (These ports should be configurable during system deployment). Each SDNA node has a private key and a public key certificate. The key/certificate pair is generated in the initial configuration of each node. The user can replace the key/certificate afterwards using the Northbound Interface and ACC.

The SDNA secret key is saved in the memory of SDNA Entity in following structure:

```
struct session_key
{
    unsigned char key [30];    // random bytes, secret key for hash
                               calculation
    uint32_t type;             // Endpoint, Intermediate Node, or Gateway?
    time_t ts;                 // timestamp in seconds, update on each use
    uint16_t snum;             //session ID in network order
    struct in6_addr rewrite_ip    // next hop IP if it id Intermediate Node
                               or Gateway
                               // GuestOS IP if it is Endpoint
```

The Key Structure is associated with the source and destination IP pair and saved in the Session Map. The key structure not only includes the 30 bytes secret key with the device type and session ID, but also includes a timestamp and the rewrite IP. The rewrite IP is used for IP forwarding. The timestamp is the time in seconds since Epoch when the key is used. If the key on the sender has not been used after 2 minutes, it will expire. The sender will delete the key record and inform the other SDNA node on the path to delete the records for this key, via key exchange channel (port 4433 on Intermediate Nodes and the port 4434 on Endpoint and Gateway nodes). If the connection has not ended and a new packet is about to be sent from an Endpoint or Gateway, SDNA Entity cannot find the key, then it will initialize a new key set up and exchange to resume the connection.

SDNA Entity implements packet forwarding using a few IP address mappings. There are three basic types of SDNA nodes: Endpoint, Intermediate, and Gateway. Each type of SDNA Entity plays a different role in SDNA network.

The Endpoint SDNA Entity forwards packets between Guest OS and Intermediate Nodes based on a "token to Real IP" map, where the Real IP is the Intermediate Node's IP with session bits set. When SDNA Entity on an Endpoint forwards the packet to the protected Guest OS, it changes the source IP address to a token IP; when the packet comes from the Guest OS, it changes the destination IP from the token IP to the Intermediate Node's IP with session bits set. In this scenario, the Intermediate Node's IP is hidden away from Guest OS. If the Guest OS is infected, the intruder cannot discover the network topology from the Guest OS.

Figure 6:
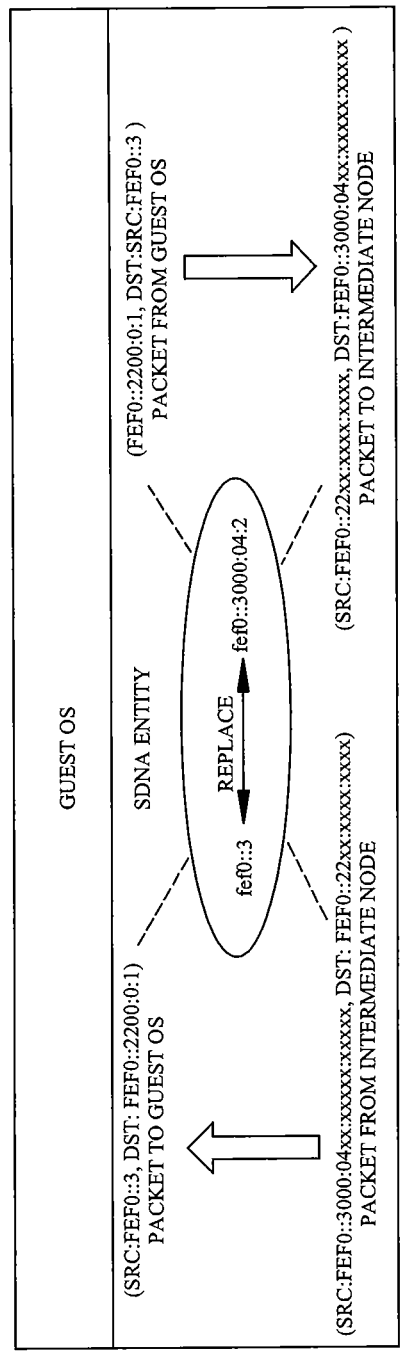
FIG. 6 is a schematic diagram showing IP address mapping on Endpoint.

Referring to FIG. 6, the token IP is a unicast IP (e.g. fef0::3) randomly generated when the first packet is about to be forwarded to the Guest OS or when a DNS response is received. Then, the SDNA Entity on the Endpoint maintains a "Token-Real IP" map in memory, where the real IP address is the Intermediate Node's IP address with session bits set. If the session ID is released, the record for this "Token-Real IP" will be deleted from the map, and this token IP can be re-used for new sessions. The mapping for active sessions will be persisted, thereby providing continuity of operation for the protected host using token IPs in the event of reboots of the SDNA Entity.

The Intermediate Node SDNA Entity forwards packets between an Endpoint and another Endpoint, or an Endpoint and a Gateway, based on the Session Map. The "rewrite_ip" field in the Key Structure is the IP address of the next hop. The Intermediate Node SDNA Entity first verifies the metadata. If successful, it replaces the source IP with its own IP with session bits set, and replaces the destination IP with the "rewrite_ip", constructs the metadata, and forwards the packet to the next hop.

Figure 7:
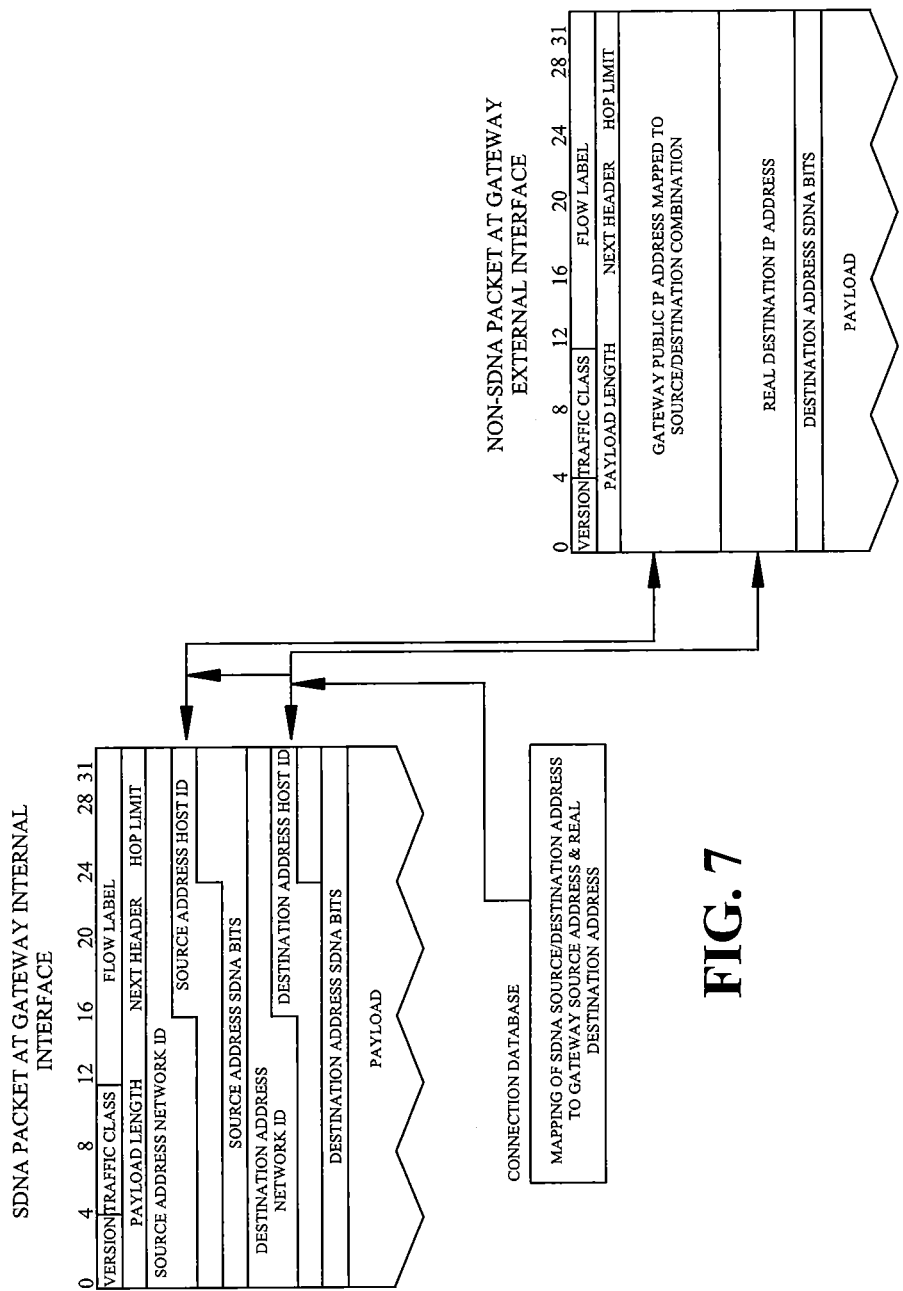
FIG. 7 is a schematic drawing of a Gateway Node packet and modification.

The Gateway node SDNA Entity forwards the packets between an Intermediate Node and external non-SDNA network. The Gateway Node, sitting on the boundary between the SDNA enclave and the external networks, does not host a Guest OS. It supports out-bound connections originating from within the SDNA enclave as well as in-bound connections to the enclave (as determined by policy). The network dynamics added by SDNA result in the packets being unable to be understood by hosts on non-SDNA networks (and vice versa), which prevents successful connections. To properly send packets outside the enclave, the Gateway Node of the enclave must perform a mapping between the SDNA and non-SDNA views of the network. As shown in FIG. 7, the Gateway node substitutes the original source address with one of its public IP addresses and the original destination address with the external destination IP address. The substitutions are tracked in an internal connection mapping database.

Routing tables within the SDNA enclave are maintained by SDNA Entities using the RIPng protocol. Each SDNA Entity uses RIPng to broadcast the subnet provided by that node. Firewall rules are defined to allow RIPng packets to bypass SDNA processing.

With the state provided by RIPng, the failure of nodes can be detected. For instance, the local DNS server can monitor the status of the subnets provided by the collection of Intermediate Nodes, and use that status to determine which Intermediate Nodes are present. Thus, during DNS redirection, the local DNS server can redirect the new connection through an Intermediate Node that is available.

Figure 8:
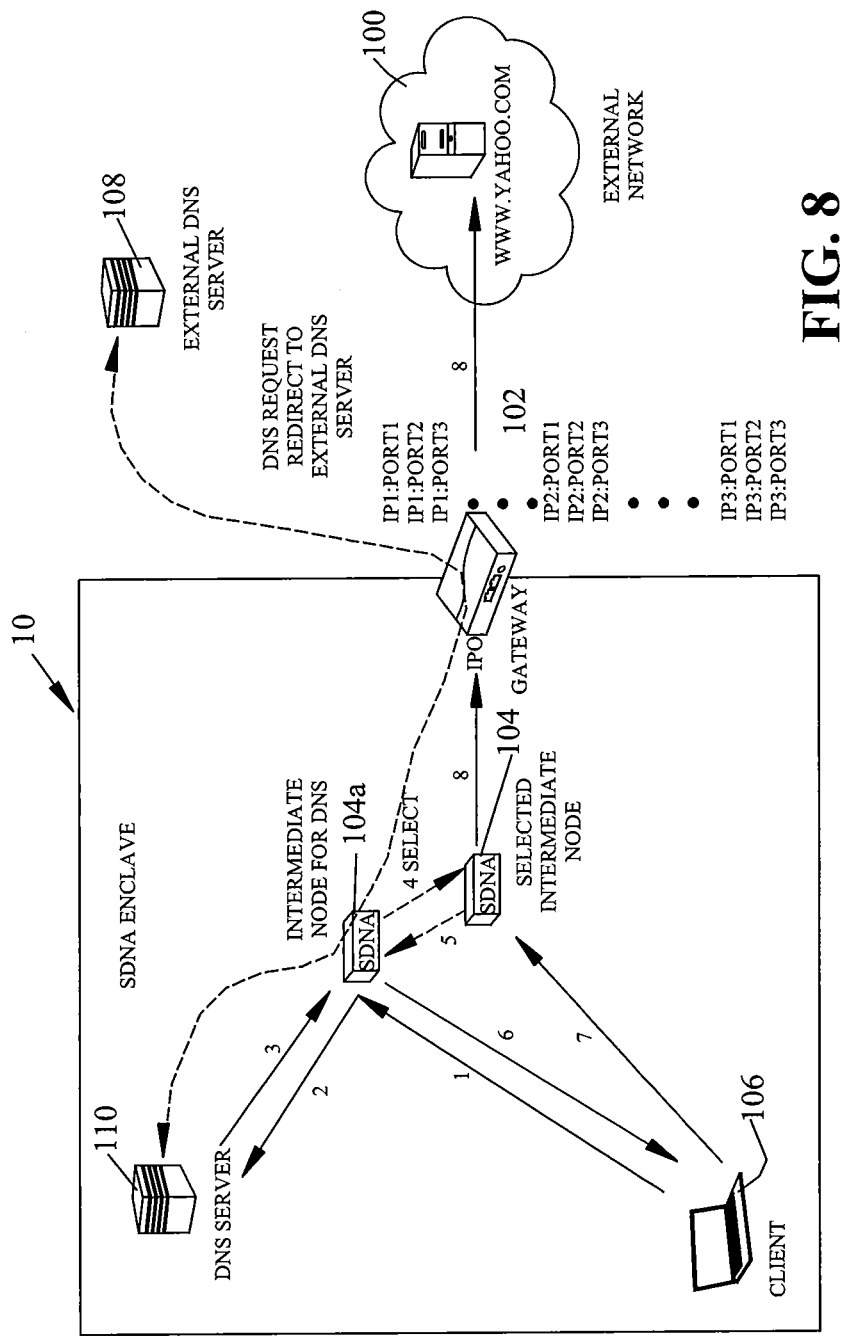
FIG. 8 is a schematic diagram of an out-bound connection to an external network.

FIG. 8 illustrates a client within the SDNA enclave 10 connecting to an external server 100 (e.g. www.yahoo.com) through an SDNA Gateway 102. The Gateway contains two types of IP addresses: an internal SDNA IPv6 address (IP0) and a pool of publically routable IP addresses (IPv6 or IPv4) which are exposed to the external network 100. If the external network 100 is IPv4, the Gateway SDNA Entity 102 will convert the IP stack between IPv4 and IPv6 for each packet. The connection procedure is similar to that discussed previously except for the following aspects:

In step 4, the Intermediate Node 104 should check if the DNS response IP is internal or external IP by the known range of internal IPs. If it is for external Server 108, the Intermediate Node 104 should set up a connection for client 106 and Outgoing Gateway (IP0) for key setup. The Intermediate Node should also maintain a "session ID to external server IP" map. This map is forwarded to the Gateway during key setup.

Unlike the server in FIG. 4, which maintains a "Token-Real IP" map, the Gateway should generate and maintain an Outgoing Gateway Map (see Table 5). The "Real IP" is the Intermediate Node's IP address with session bits set; the "External Destination IP" is the IP address for the external Server; and the "Gateway External IP" is one of the IP addresses from the Gateway's external IP pool (IP1, IP2, IP3 . . . ). The Gateway randomly picks an unused IP from the external IP pool to generate an entry in the map for a new connection. Note (External Gateway IP: port) is used in the map rather than only External Gateway IP; this saves resources of External Gateway IP, because the same External Gateway IP can be used with different ports to map back to different hosts in the SDNA enclave.

When the Gateway 102 (IP0) receives a packet in step 8, the SDNA Entity checks the "<Real IP, External Server IP>-External Gateway IP" map, modifies the packet to replace its source IP with the External Gateway IP and replace the destination IP with the external server IP, then forward it to the external destination. (On reverse traffic, it replaces the source IP with its SDNA internal IP (IP0) and forwards it to Intermediate Node ("Real IP")).

If the local DNS Server cannot resolve a hostname (www.yahoo.com) internally, the DNS server 110 will recursively service the DNS request by querying one or more DNS servers in the external network, via the "Intermediate Node for DNS" and the Gateway. The Intermediate Node for DNS should reserve a session ID for this request, and the Gateway should reserve an entry for this request in the "<Real IP, External Server IP>-External Gateway IP" map.

Figure 9:
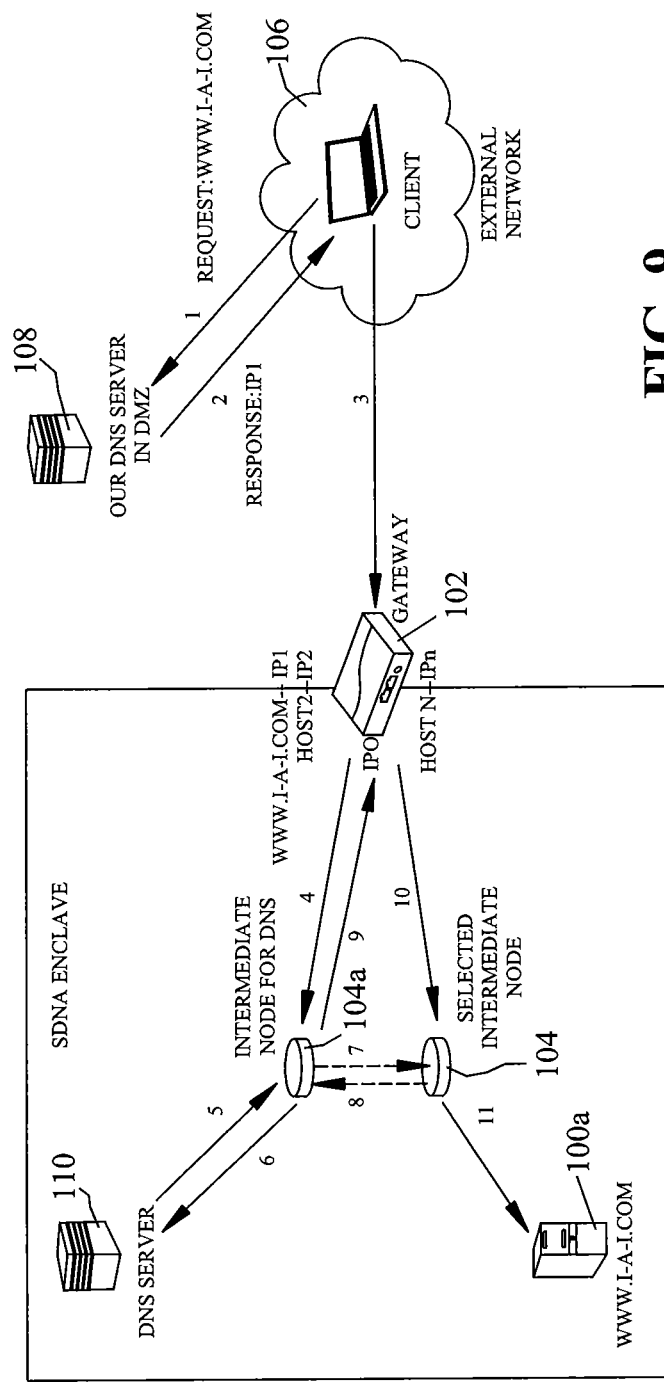
FIG. 9 is a schematic diagram of an in-bound connection from an external network.

FIG. 9 illustrates a client from an external network 100 connecting to a server (e.g. www.i a i.com) inside SDNA enclave. For this use case, the Gateway also contains two types of IP addresses: the internal SDNA IPv6 address (IP0) and the pool of external routable IP addresses (IPv6 or IPv4) which are exposed to external network. The Gateway implements polices to decide which hosts inside SDNA enclave can be accessed from outside and pre-configures a Host-IP Map (see Table 5) between global IP and the hostnames allowed to be accessed from outside. (e.g. www.i a i.com-IP1).

Deployments must also provide a publically-accessible authoritative name server for all domains hosted within the SDNA enclave 10. The configuration of this DNS server 110 must match the "host-IP" map on the Gateway 102.

The connection completes in the following steps:

The client requests an address for www.i-a-i.com.

The external DNS server 108 responds with the corresponding global IP address of the Gateway 102 (e.g. IP1) (not the real IP address of the host inside SDNA enclave).

The client sends data packets with destination address of IP1.

The Gateway 102 checks the Host-IP Map and finds the destination host name: www.i-a-i.com. Then it sends a DNS request for www.i-a-i.com to the Intermediate Node for DNS 104*a* (from IP0).

After the Gateway gets the address, it constructs an Incoming Gateway Map entry, and uses this entry for forwarding future packets. The "internal IP" is the selected Intermediate Node's IP with the correlated session bits set.

The rest of the steps are same as steps 7-9 as set forth previously; the Gateway forwards the packet between the client and server via the selected Intermediate Node.

SDNA implements policies to restrict the visibility of services on Endpoint nodes within the SDNA enclave. The policies are enforced, by the receiving Endpoint, during the key exchange process.

Both users and devices are included in policy groups. Devices are included to allow user-independent services on an Endpoint to perform network actions even if no user is logged-in. The pre-defined group "All" includes all users and devices by default. Users and devices belong to a minimum of one group (the "All" group) and may belong to more.

Group membership is defined as the tuple (user, group). The user identifier is either the user's username or the device's MAC address; both are represented as a string in UTF-8 encoding. The group identifier is an unsigned 32-bit integer. The ACC maintains the master list of groups, which includes a textual group description to facilitate policy management.

A policy is defined as the tuple (sender group, receiver group, destination port range list, action). The group identifiers are unsigned 32-bit integers. The port range list is defined below. The action identifier is an unsigned 8-bit integer.

The receiver group is determined by the identity of the receiving Endpoint and is not affected by the logged-in user at the receiver. Since an Endpoint's group membership is quasi-static (may only change when policy updates are received from the ACC on the northbound interface), each Endpoint only receives from the ACC the policy set for its receiver group set and keeps a Policy Map (see Table 5) in memory.

Each policy includes a list of transport layer protocol port ranges that limit the scope of the policy. The transport layer protocol identifier, per RFC5237, is an unsigned 8-bit integer. The transport layer protocols applicable to SDNA policies are TCP (protocol 6) and UDP (protocol 17). A port number, per RFC6335, is an unsigned 16-bit integer. Consequently, the port range identifier is an unsigned 32-bit integer, where the most-significant 16-bits are the starting port number and the least-significant 16-bits are the ending port number. The starting port number must be less than or equal to the ending port number. For example, the port range value 0x00000001 is the range of ports 0 to 1, the port range value 0x12341234 is the single port 4660, and the port range value 0x0000FFFF is the entire range of ports from 0 to 65535.

Each policy specifies an action to be taken. It is stored in an unsigned 8-bit integer. The lower 4 bits define the action (providing a possibility of 16 different actions) while the upper 4 bits are action modifiers. Unlike users, groups, and policies, the set of possible actions is fixed and cannot be changed dynamically. Additionally, actions are prioritized by the decimal value of the lower 4 bits of the action. If two or more policies are applicable and have different actions, the higher value action will be prioritized over the lower value actions. The set of defined actions and resulting behavior is listed in Table 6, in order of priority.

```
CRITICAL =      0 # Fatal error, may crash application.
ERROR =         1 # Recoverable error
WARNING =       2 # Warning about potential problem.
INFO =          3 # Informational message
DEBUG =         4 # Debugging trace
VERBOSE =       5 # Verbose debugging trace
```

TABLE 6

Security Policy Actions

| Action | Value | Behavior |
|---|---|---|
| REDIRECT | 1 | This action causes the packet's destination to be sent to another destination by the Intermediate Node. The alternate destination's IP address, represented as a string in UTF-8 encoding, is specified in addition to the action itself. During the key exchange process, instead of the destination Endpoint generating a key and sending it to the Intermediate Node, the destination Endpoint directs the Intermediate Node to establish a session with the alternate destination. The Intemiediate Node then repeats the key exchange process with this new destination. This action can be used to implement honeypot routing. |
| INVISIBLE | 0 | This action causes the packet's destination to silently discard the packet. No key is generated or communicated back to the Intemiediate Node. |
| NOTIFY | 2 | This action causes the packet's destination to discard the packet, but an ICMPv6 response is sent to the sender with type value 1 (Destination Unreachable) and code value 1 (Communication with destination administratively prohibited). |
| VISIBLE | 3 | This action allows the packet to continue to the intended destination. |
| LOG | 0x10 (modifier) | The source address, destination address, destination port, sender's group membership, action, and timestamp are logged and sent to the ACC. |
| REQUIRE_PIN | 0x80 (modifier) | For each new connection (each SYN packet for TCP or due to a timeout or new source port for UDP), the user is prompted for their PIN. Packets are queued until the PIN is provided. If no PIN is given, the policy is treated as a REDIRECT action if a redirect value is given in the policy, otherwise INVISIBLE is used. |

Policy enforcement is triggered by the destination Endpoint receiving the key setup message. Enforcement of policy requires knowing the group membership set of the sender and the destination port of the connection. Both the sender's group membership set and the connection's destination port are sent in the key setup message. Using the sender's group membership set and the destination port of the connection, the set of applicable policy rules is determined by the destination Endpoint. The action is determined by the policy rule with the most narrowly defined port range. If no policy rule is applicable, the default action is INVISIBLE.

Enforcing policy during key exchange means that policy is only enforced once per connection and not with every packet that is received during that connection. However, this implies that key exchange must occur for all combinations of source, destination, and port. A connection cannot be re-used for different port traffic, as the policy might not be the same. This design requirement is noted above.

In the event that the policy set is changed while active connections exist, the revised policy set is only applied to future connections; active connections are unmodified.

SDNA provides a system logger for debugging and management. SDNA defines the following 6 severity logging levels:

Each log message has the following format:
<Time Stamp (e.g. "Sun Sep 3019:20:09 2012")><Severity Level (e.g. "debug")><Text message>

The severity logging level is user configurable, the default value being "INFO". The system only logs messages with the same and lower severity value; e.g. by default, only INFO, DEBUG and VERBOSE messages will be logged. The log is located at "/var/log/sdna.log". The log is implemented using syslog library and the log rotation should be handled in syslog configuration.

The Administration Node is a specialized Endpoint node that enables the Administration Control Center (ACC) to configure, control and monitor the SDNA network. The ACC (and supporting infrastructure) run in the Guest OS of the Administration Node.

Figure 10:
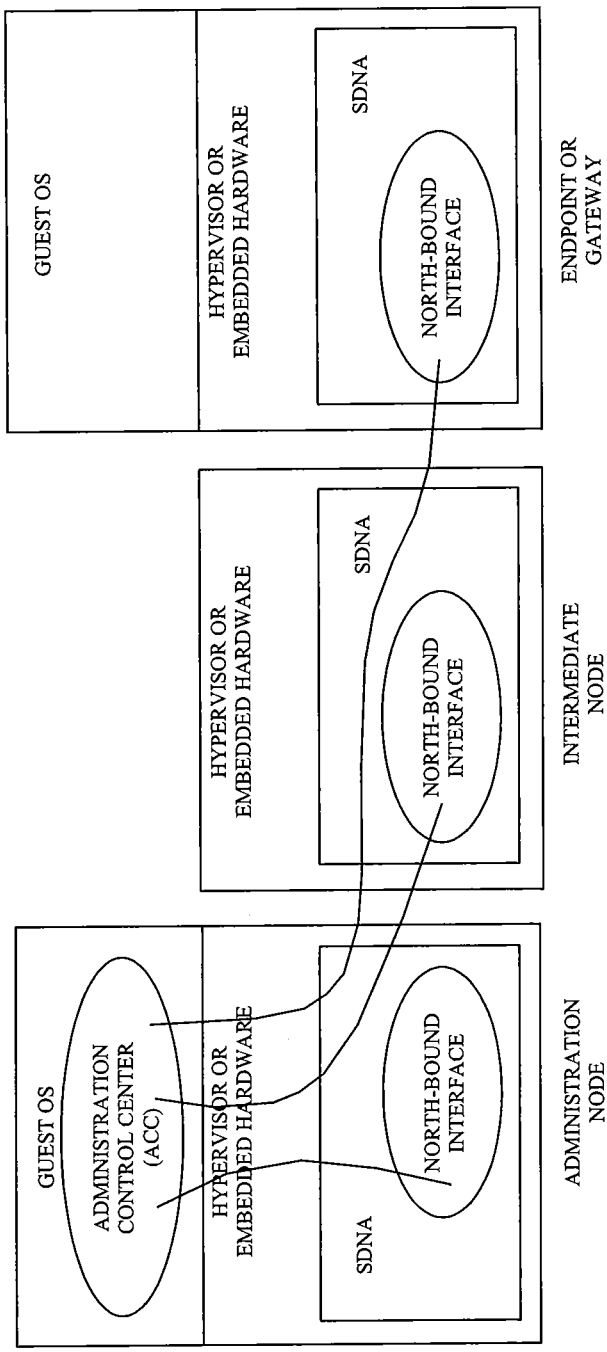
FIG. 10 is a schematic diagram showing architecture and management traffic flow between the ACC and the SDNA nodes.

FIG. 10 shows the architecture and the flow of management traffic between the ACC and the SDNA nodes. Each SDNA node, in the SDNA Entity, runs a server process that accepts connections on TCP port 4435. The ACC, in response to changes initiated by the network administrator in the GUI, opens a connection to this port on the applicable SDNA node to set node configuration and request node status. Additionally, the ACC runs a server process that accepts connections on TCP port 4436. The SDNA Entity on each node opens a connection to this port on the ACC to indicate initial registration and transfer network traffic log information.

Unlike regular traffic (see FIG. 2), management traffic from the ACC to an SDNA node does not pass through the receiving SDNA Entity to the Guest OS; the SDNA Entity is the consumer of the management traffic. Therefore, the SDNA Entity must be able to distinguish management traffic from other traffic destined for the Guest OS. To this end, traffic destined for the management port (4435) is consumed by the server process in the SDNA Entity, and is not passed on to the Guest OS. The implication of this design is that connections cannot be opened to the ACC's Guest OS and other Guest OS's using port 4435. This is the same implication as the key exchange ports 4433 and 4434 for Endpoint and Intermediate Nodes, respectively. These ports should be configurable during system deployment.

All connections between ACC and SDNA Northbound Interface are protected using SDNA PKI based TLSv1 encryption. Both the SDNA Entity and ACC Endpoints validate that each other's certificates are signed by a trusted Certificate Authority.

The northbound interface on an SDNA Entity provides functions for changing the configuration of an SDNA node, functions for requesting the status of an SDNA node, and functions for controlling aspects of the SDNA Entity's operation.

setNode
    Inputs: Node ID, Node Type
    Result: In the SDNA configuration file/etc/sdna/sdna.cfg, the SDNA Entity sets the parameter nodeID to the specified node ID and the parameter nodeType to the specified node type. SDNA uses the parameters nodeID and nodeType during initialization to set the node's IP address, set the node's operational mode, and configure the node's internal DHCP server. A restart of the SDNA Entity is scheduled to run after any remaining configuration changes in the current message are processed.

setDNS
    Input: DNS IP Addresses
    Result: In the file/etc/resolv.conf, the SDNA Entity replaces the IP address portion of the line beginning with "nameserver" with the specified IP addresses. This change does not require a restart, as the 'dnsmasq' process continuously polls for changes to/etc/resolv.conf.

setPolicy
    Input: Policy revision, Policy set
    Result: If the SDNA node receiving this request is an Intermediate Node, the request is ignored. Otherwise, the SDNA Entity compares the stored policy revision value with the received policy revision value. If the received policy is not a newer revision than the stored policy, the request is ignored. Otherwise, the SDNA Entity parses the user-to-group mappings from the specified policy set. The SDNA Entity then parses the policy rules. The policy rules do not include the receiver group identifier because the ACC only sends the policy rules applicable to the specific SDNA Entity. If a restart is not already scheduled, the SDNA Entity suspends processing key exchange requests, flushes its existing policy set, installs the updated policy set, and resumes processing key exchange requests. Further, the user-to-group mappings and the updated policy set are written to/etc/sdna/user_groups.cfg and/etc/sdna/policy_rules.cfg, respectively.

setGateway
    Input: Gateway Node ID
    Result: If the SDNA node receiving this request is not an Intermediate Node, the request is ignored. Otherwise, in the SDNA configuration file/etc/sdna/sdna.cfg, the SDNA Entity sets the parameter Gateway_nodeID to the specified node ID. This will cause the SDNA Entity of the Intermediate Node to substitute IP addresses external to the SDNA enclave with the Gateway's internal IP address. A restart of the SDNA Entity is scheduled to run after any remaining configuration changes in the current message are processed.

setExtIP
    Input: List of public IP Addresses
    Result: If the SDNA node receiving this request is not a Gateway node, the request is ignored. Otherwise, the SDNA Entity parses the list of IP address and replaces the contents of/etc/sdna/external_IPs.cfg with the parsed input. These IP addresses are used for connections out-bound from the SDNA enclave. A restart of the SDNA Entity is scheduled to run after any remaining configuration changes in the current message are processed.

setExtIPMap
    Input: List of hostname-to-IP Address mappings
    Result: If the SDNA node receiving this request is not a Gateway node, the request is ignored. Otherwise, the SDNA Entity parses the list of hostname-to-IP address mappings and replaces the contents of/etc/sdna/hostname_IP_mapping.cfg with the parsed input. These mappings are used for determining the real destination of connections in-bound to the SDNA enclave. A restart of the SDNA Entity is scheduled to run after any remaining configuration changes in the current message are processed.

setLogging Destination
    Input: Hostname, port number
    Result: The SDNA Entity opens a TCP connection to the specified hostname at the specified port number and commences collecting and transmitting log data. If the hostname value is the case-sensitive JSON literal "null", then the SDNA Entity stops collecting data and closes any open TCP connections for logging. This is the means by which logging can be disabled.

Stat request functions include:

getSysInfo
    Inputs: None
    Result: The SDNA Entity responds to the request with information including the node ID, the node type, the MAC addresses of the SDNA Entity and the Guest OS, the IP addresses of the SDNA Entity and the Guest OS, and the username of the logged-in user.

getGateway
    Input: None
    Result: If the SDNA node receiving this request is not an Intermediate Node, the request is ignored. Otherwise, the SDNA Entity responds with the node ID and IP address of the configured Gateway.

getExtIP
    Input: None
    Result: If the SDNA node receiving this request is not a Gateway node, the request is ignored. Otherwise, the SDNA Entity responds with the list of configured external IP addresses.

getExtIpMap
  Input: None
  Result: If the SDNA node receiving this request is not a Gateway node, the request is ignored. Otherwise, the SDNA Entity responds with the list of configured hostname-to-IP address mappings.

SDNA entity operation functions include:

pinProvided
  Input: the hostname/IP/port that a PIN was provided for (not the PIN itself, the provider is responsible for verifying that)
  Result: The SDNA Entity releases the connection for which the PIN was needed.

login
  Inputs: Username
  Result: This API is available only from the SDNA Entity and/or Guest OS (depending on configuration), and is not used by the ACC. If a user is already logged in, the existing user will be logged out and the SDNA Entity will log an error. If the input username is a valid username listed in/etc/sdna/user_groups.cfg, the user will be logged in. Otherwise, no actions will be taken. Logging in a user modifies the sender group membership sent during key exchange.

logout
  Input: None
  Result: This API is available only from the SDNA Entity and/or Guest OS (depending on configuration), and is not used by the ACC. If no user is already logged in, no actions will be taken. Otherwise, active sessions associated with that username will be terminated and the user will be logged out. Active sessions using the device's credentials will be unaffected.

generateCSR
  Input: None
  Result: The SDNA Entity will generate new PKI private and public keys. A public key certificate request is returned to the requestor for signing. The private key is stored in/root/.sdna/ssl_keys/server.key.new until a signed certificate is received via the storeCertificate message. The keys are 2048-bit RSA keys generated using OpenSSL, as recommended by NIST SP 800-131A [3].

storeCertificate
  Input: Signed Public Key X509 Certificate
  Result: The SDNA Entity replaces the existing public key certificate (stored at /root/.sdna/ssl_keys/server.crt) with the certificate provided in this message. Additionally, the existing private key (stored at/root/.sdna/ssl_keys/server.key) is replaced with the private key generated by the preceding generateCSR request (stored at/root/.sdna/ssl_keys/server-key.new). The SDNA Entity restarts after storing the new PKI keys so that the SSL servers can use the newly generated keys.

The administrative interface is implemented by the ACC and provides functions for receiving registration notices from SDNA nodes and receiving network log information for SDNA nodes.

registerNode
  Input: PKI public key, MAC Address, Policy Revision
  Result: If the PKI public key provided does not exist in the ACC's configuration database, no action will be taken by the ACC. If the PKI public key does exist, the ACC responds with a message to the SDNA node's Northbound Interface's 'setNode' and 'setDNS' requests. It is the responsibility of the SDNA node to periodically send the registerNode message if no response is received from the ACC. Additionally, if the policy revision is older (numerically lower) than the current policy revision, the ACC filters the policy set for rules that are applicable to the node's group membership and provides those to the SDNA node in the aforementioned message with the 'setPolicy' request.

reportLogInfo
  Input: Node ID, Log Type, Timestamp, List of log records
  Result: The ACC parses the list of log records according to the log type indicator, and stores the individual records in the log database with source's node ID and timestamp.

signCertificate
  Input: Public Key Certificate Request
  Result: The ACC validates the certificate request with the configuration stored in the configuration database. If all information is correct, the ACC generates a public key X509 certificate using the root CA. The generated public key X509 certificate is returned to the requesting node with the storeCertificate request.

The protected host interface is implemented by a server process on the protected host. The interface provides the access point for requesting PIN authorizations.

requestPIN
  Input: the hostname/IP/port being connected to
  Result: This is sent from the SDNA Entity upon a REQUIRE_PIN action being triggered. The Guest OS or smartcard/credentials reader is notified of a need to send a pinProvided response to the SDNA Entity.

Figure 11:
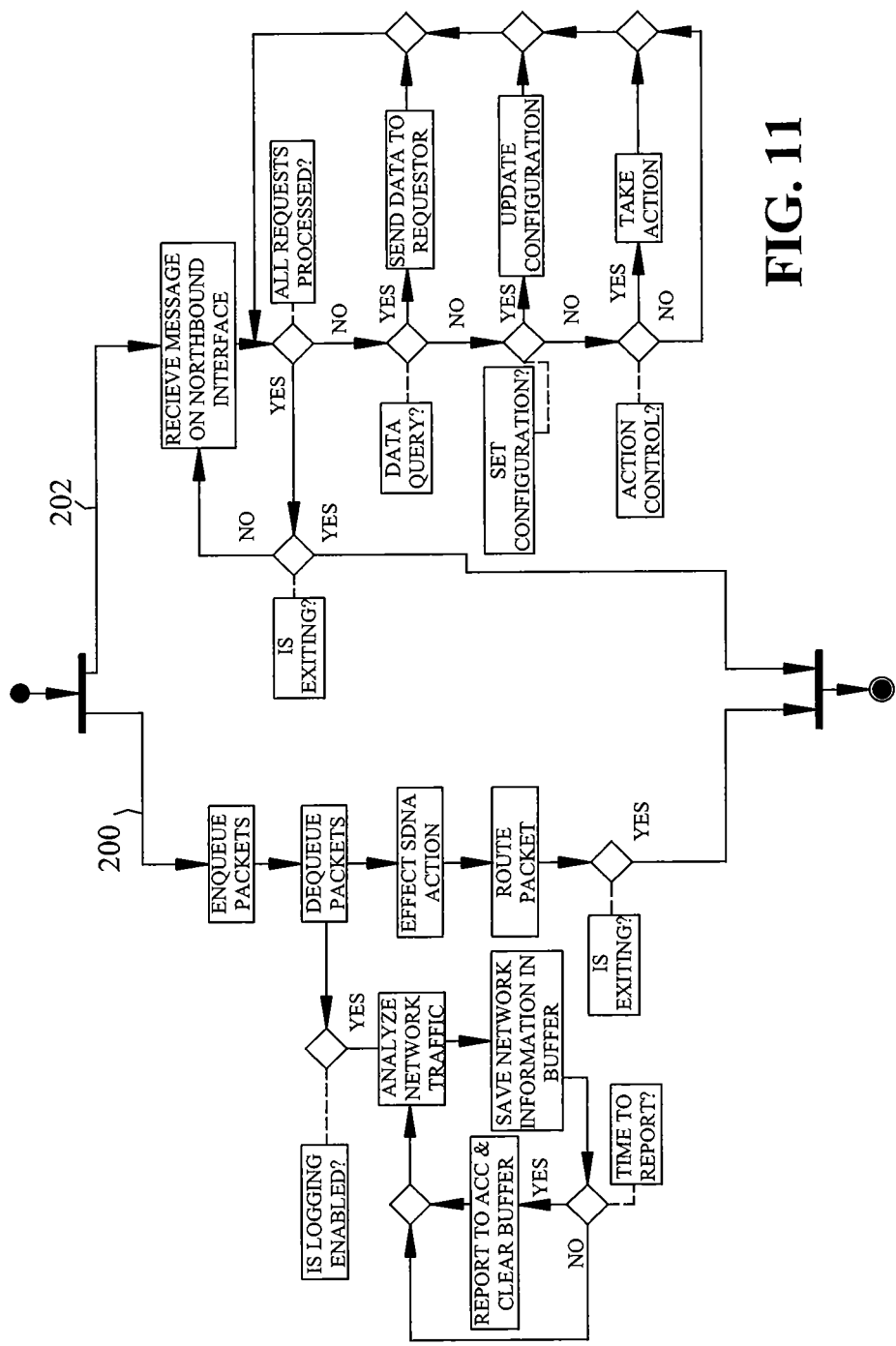
FIG. 11 is a schematic diagram of a northbound flowchart with two threads.

As shown in FIG. 11, the SDNA implements the Northbound Interface with two threads.

Thread 200 (on the left side of the figure) collects and preprocesses the regular SDNA traffic (that not going to ports 4433-4435) in real-time. If it is configured as "No Logging" via the Northbound Interface request setLoggingDestination, no data is collected; otherwise data collection commences. The data collected includes connection information (source and destination IP address, port, etc.). The collected data is reported when a new connection is detected or an existing connection has expired. If no packet for an existing connection has been detected for a certain of time, it expires, and the report is sent to the ACC to remove the connection. The default expiration time is set to 5 seconds for ICMP, 30 seconds for TCP, and 15 seconds for UDP.

Thread 202 (on the right side of the figure) is a TCP server for receiving and handling requests from the ACC or alternate sources of configuration management. The TCP server is listening on port 4435 and performs client authentication. Upon receiving a request message, the server processes the request in the order that they appear in the message, until all requests are processed. It is the responsibility of the sender of the request message to order the requests in a logical manner.

Figure 12:
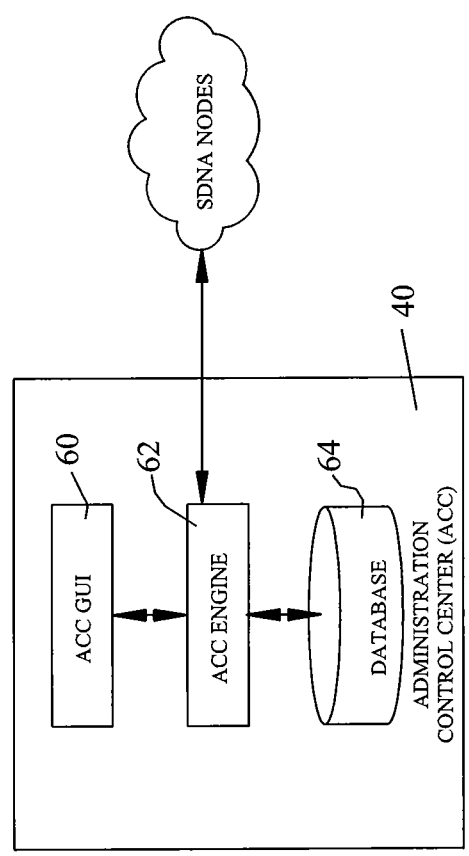
FIG. 12 is a schematic diagram of the management software components of the Administration Control Center.

Referring to FIG. 12, the management software running on the Administration Node contains 3 major components: GUI, Engine and database. The ACC interacts with SDNA nodes through the Northbound Interface to handle registration, pushing configuration and policy updates to the SDNA nodes and aggregation and collection of data from all SDNA nodes. The ACC provides an administrator a real-time display of network data as well as the ability to configure and administer the network through commands. The database stores configurations, policies, and events logged at the SDNA entities. Using the database, the ACC can display real-time data and historical data.

Figure 13:
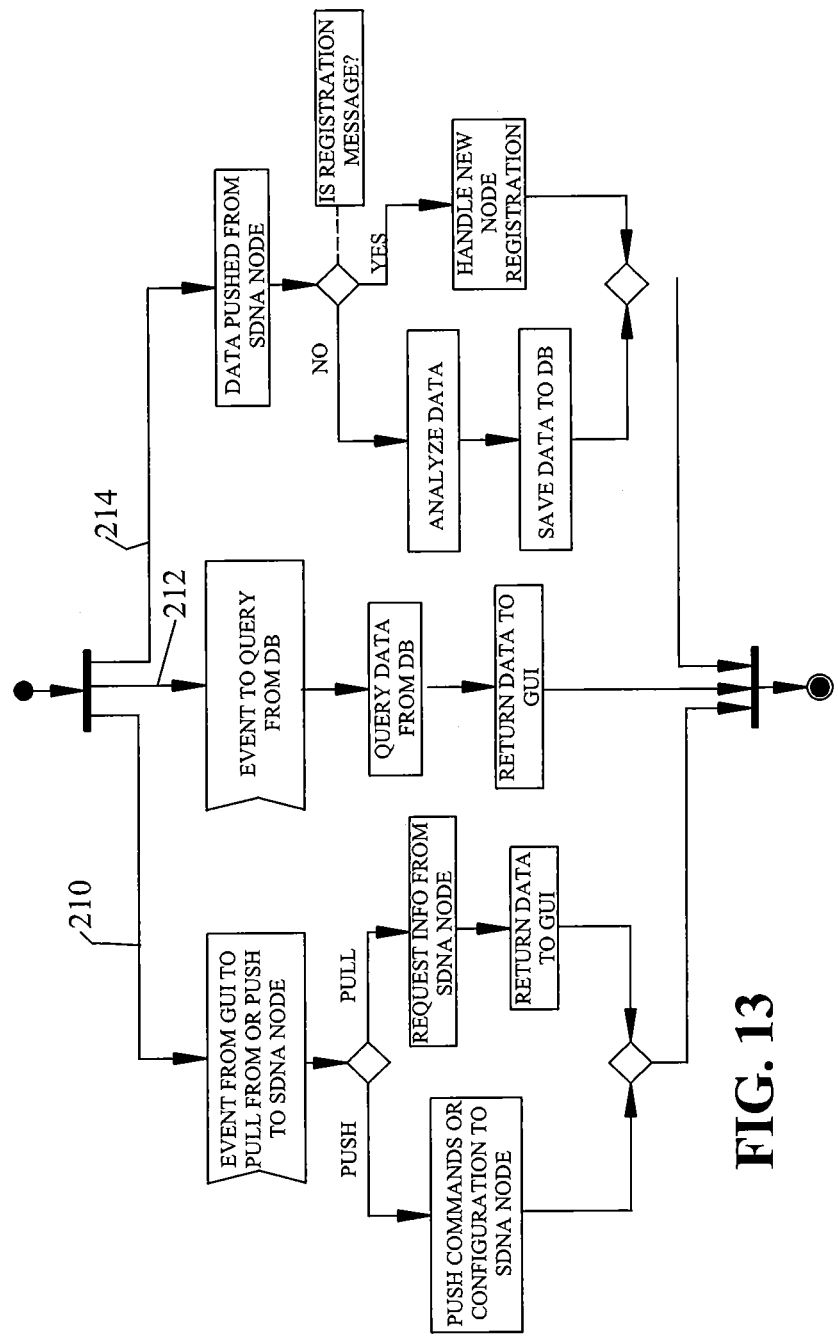
FIG. 13 is a schematic diagram of am ACC engine flowchart.

As shown in FIG. 13, the ACC contains 3 concurrent threads:

Thread 210: handles the commands from GUI to SDNA Entity. It either pushes data to or requests data from the SDNA node via the Northbound Interface on the SDNA nodes.

Thread 212: handles the query from GUI to the database. The event to query can be either manually triggered from a GUI component, or automatically triggered due to an update to the database which enables real-time data display.

Thread 214: listens on TCP port 4436 to receive registration or traffic analysis data. When a new SDNA node joins the network, it sends a registration message to the ACC and ACC will add it to the list of monitored nodes. When a traffic analysis data is received, ACC will aggregate and process it and update the related information on the database.

The GUI contains 5 components: Policy, Configuration, Gateway, Topology, and Network Analysis tabs to display and edit data and configuration associated with an SDNA enclave. The GUI is stateless; it pulls data from the ACC Engine upon launching and the ACC Engine also pushes data to it when triggered by events. Network and node configuration updates made by an administrator on the GUI is sent to the ACC Engine for storage and enforcement. The GUI and the Engine interacts through JSON messages on an SSL encrypted connection, thereby ensuring the security of the network data exchanged between them.

Figure 14:
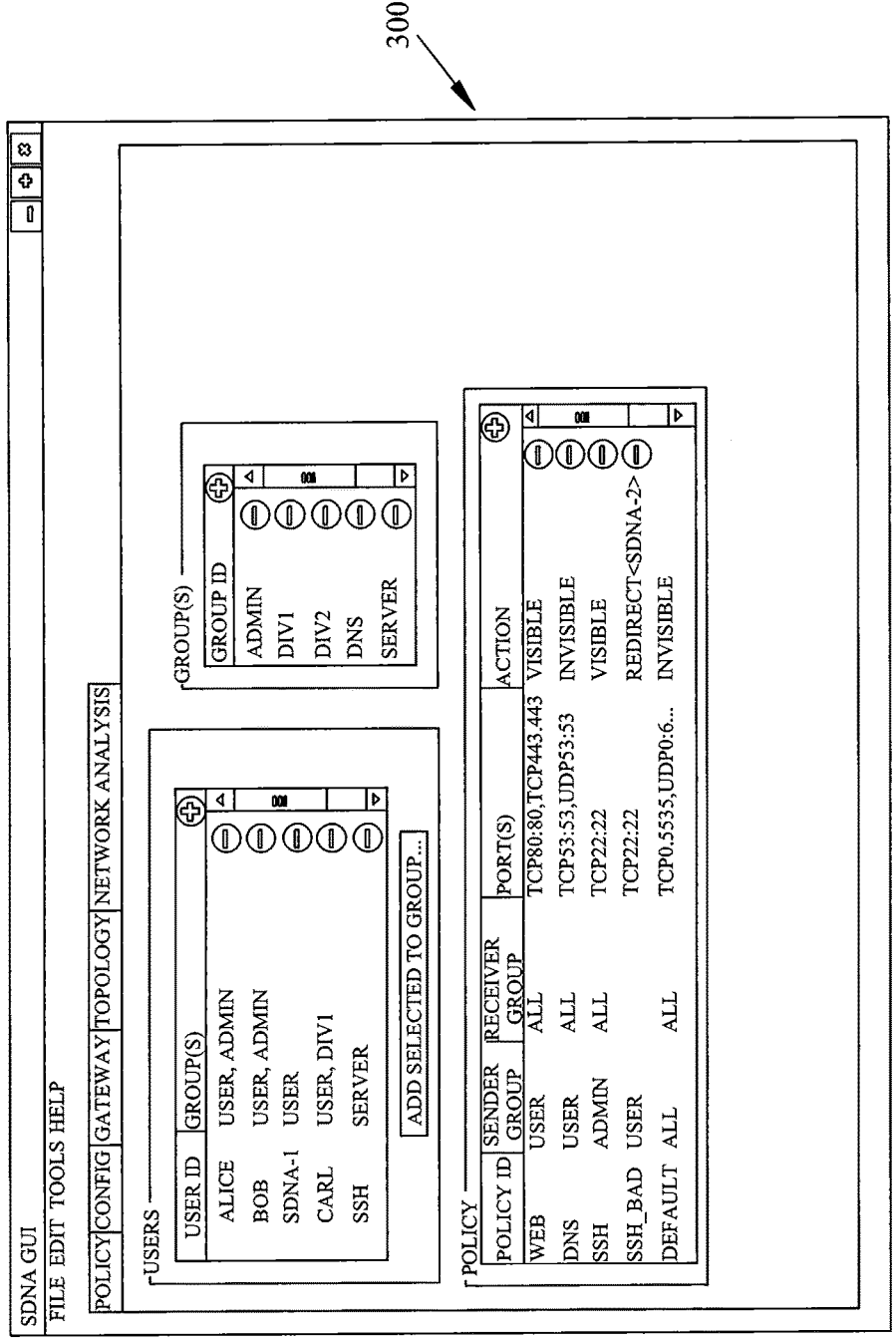
FIG. 14 is an exemplary screen shot showing GUI-Policy.

Referring to FIG. 14, a representative screen shot is shown of a Policy tab providing capabilities view and for configuring security policies. Policies are associated with user and host groups. This tab enables an administrator to specify valid users in the network and assign them to groups such that they receive the appropriate privileges for participating in the network.

Figure 15:
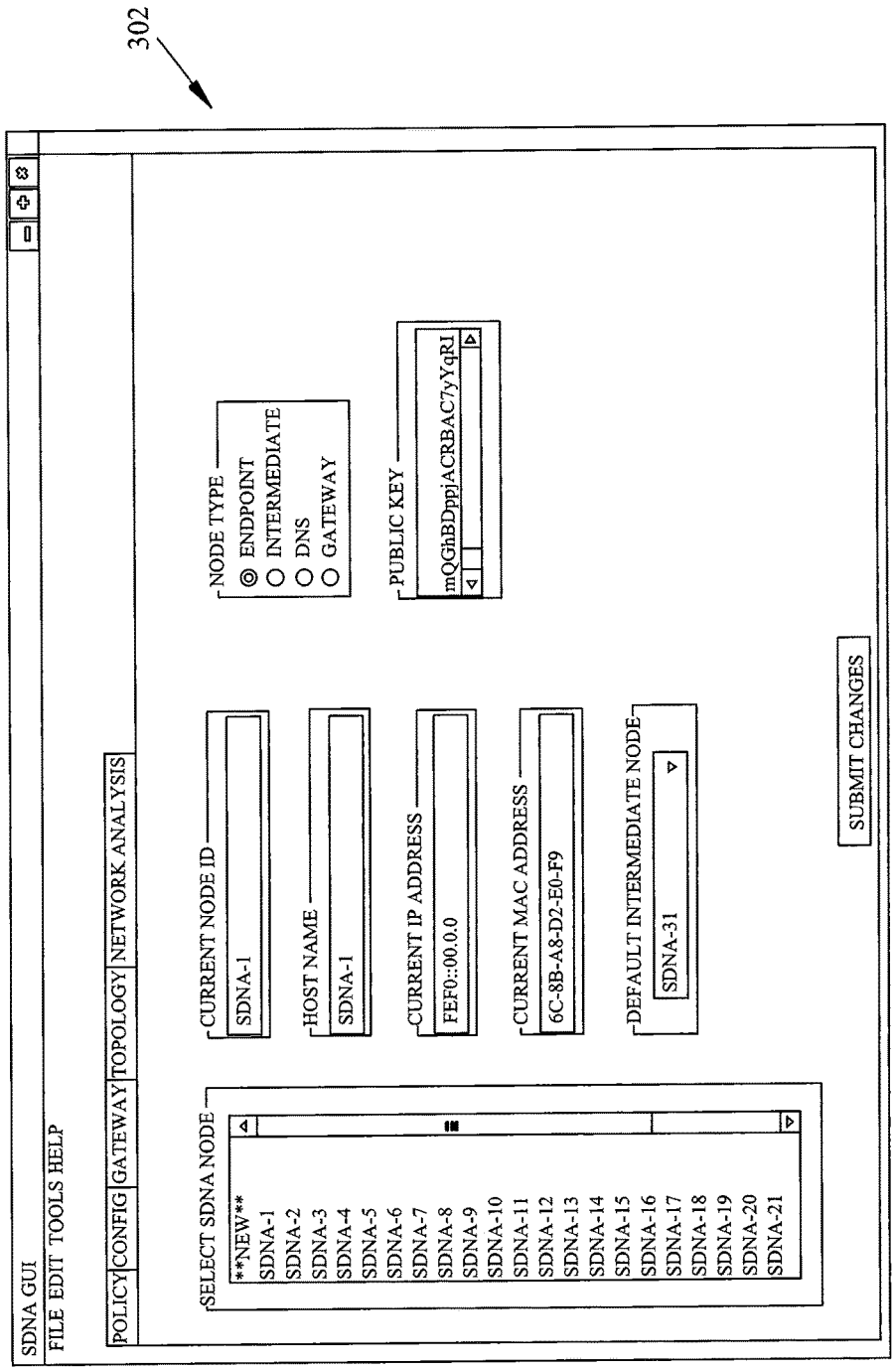
FIG. 15 is an exemplary screen shot showing GUI-Configuration.

A representative screen shot is shown in FIG. 15 of a configuration tab listing all registered SDNA nodes and provides capabilities to view and update the configuration of each SDNA node. Updating the node ID will update registration data and the global node list. If other nodes maintain information about the updated node, they will be notified about the change.

Figure 16:
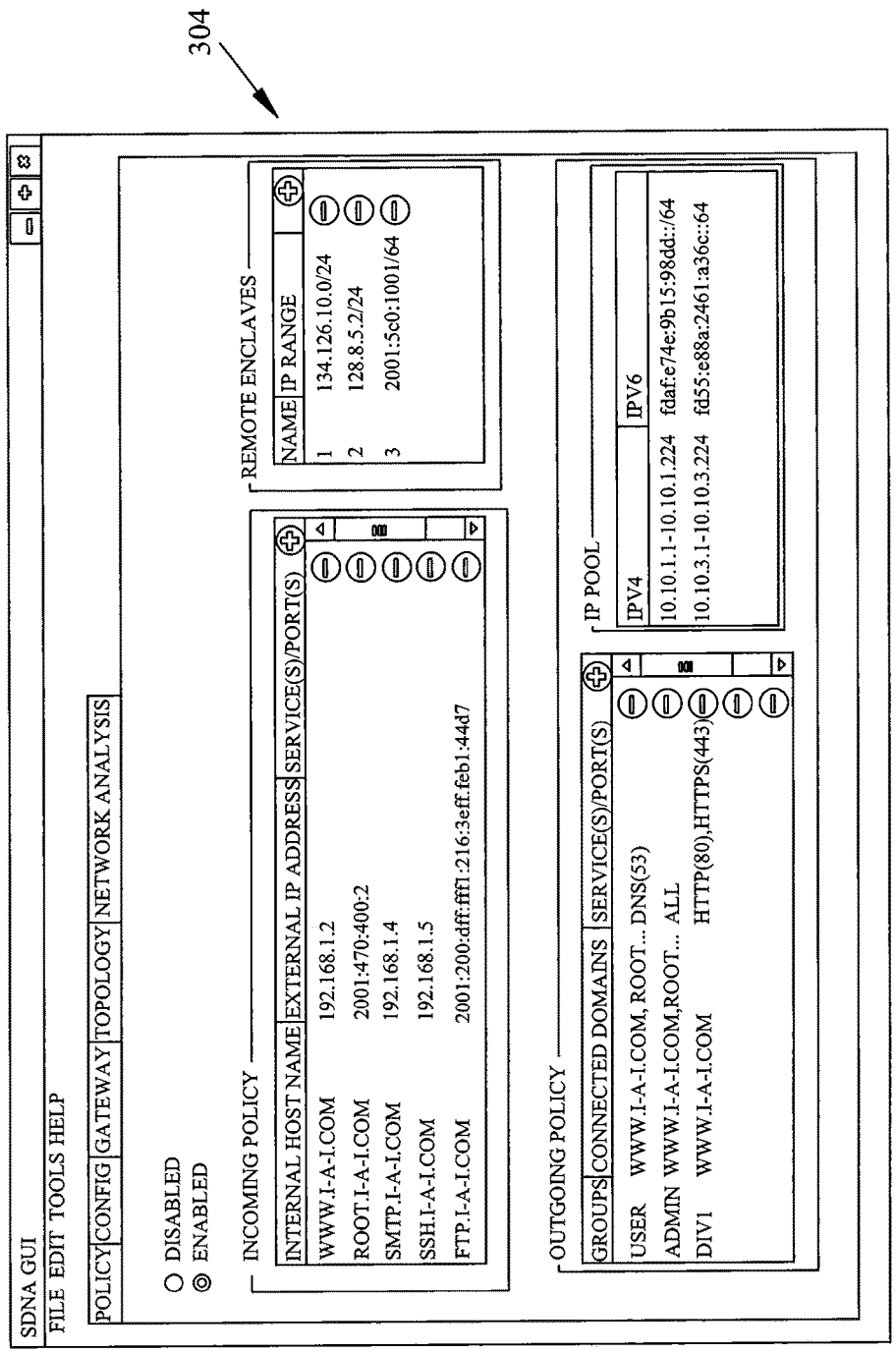
FIG. 16 is an exemplary screen shot showing GUI-Gateway.

A representative screen shot is shown in FIG. 16 of a Gateway tab providing the ability to view and set the external IP addresses and the Host-IP Map of the SDNA Gateway nodes. The administrator must make sure that the external IP addresses specified in the incoming policy are consistent with the configuration on the external DNS Server.

Figure 17:
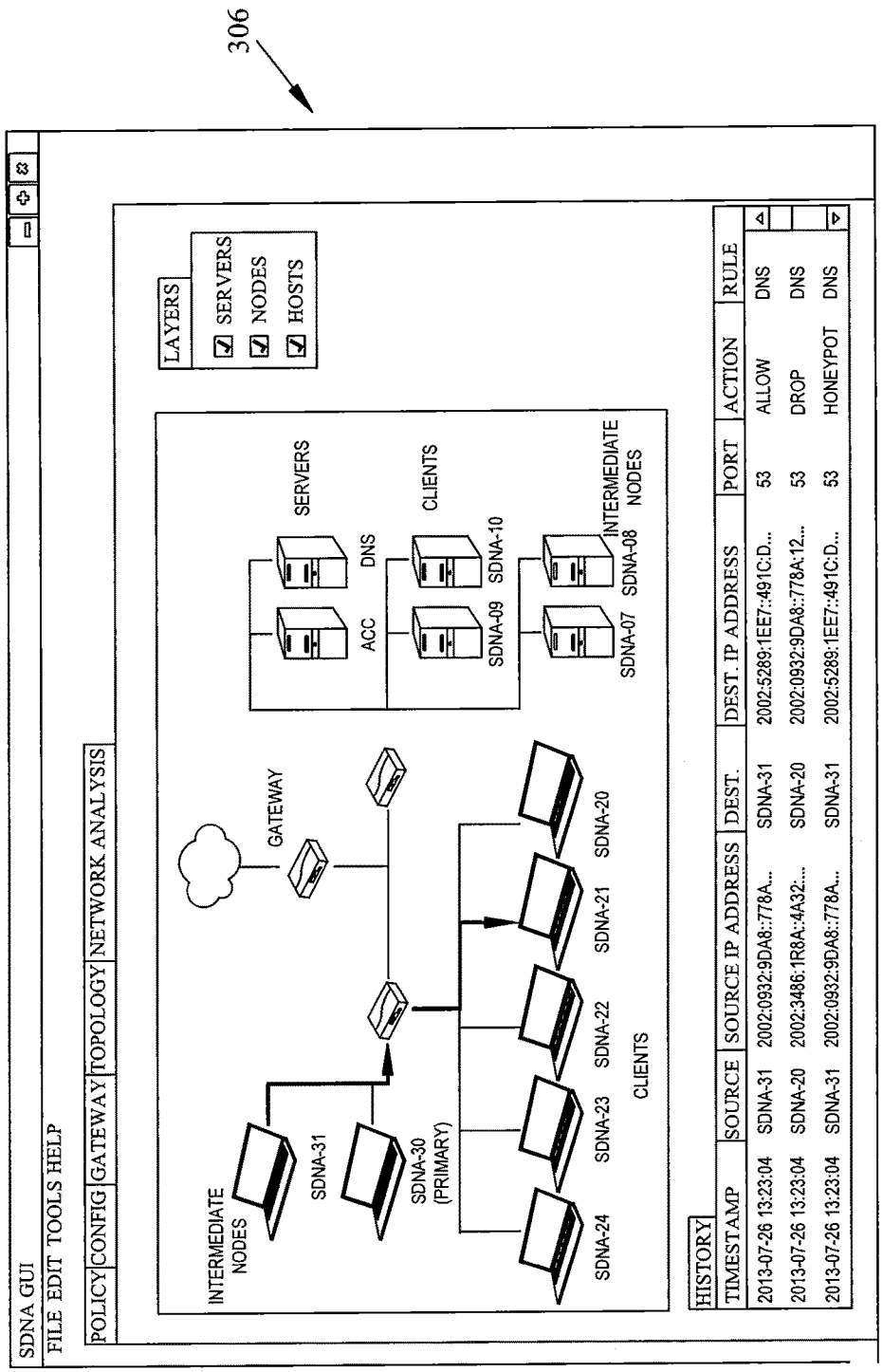
FIG. 17 is an exemplary screen shot showing GUI-Topology.
Figure 19:
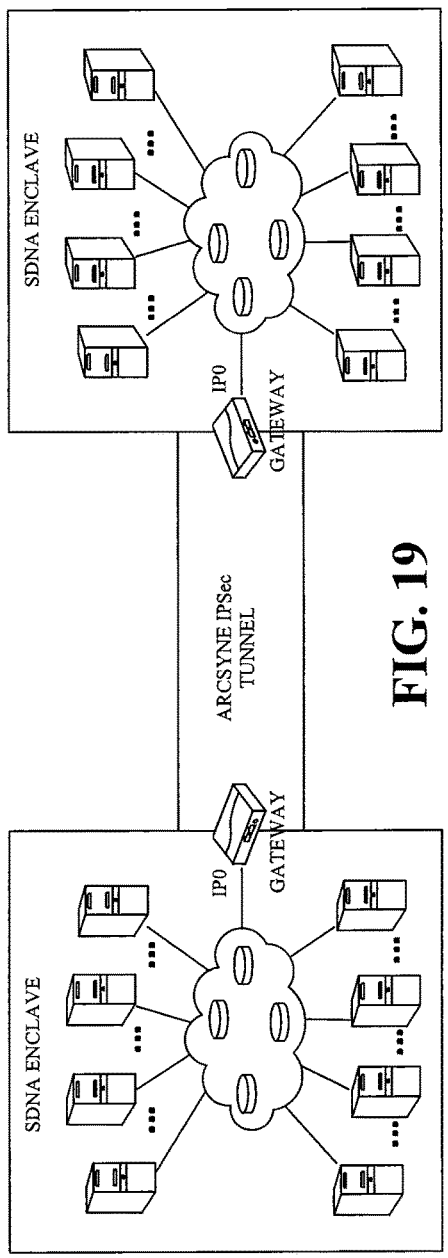
FIG. 19 is a schematic diagram showing integration with ARCSYNE.

A representative screen shot is shown in FIG. 17 of a Topology tab content containing a graph and a history table. The graph displays the network topology, active network traffic flow, and event/alert indication information, while the history table lists all active and terminated connections and their details. The topology graph is static and manually constructed by the administrator. The positions of the nodes and the connections are input by the user. The SDNA GUI provides the tools to easily construct the graph using graphical widgets. Although the topology is static, the information layer over the graph is updated in real-time. The active connection path is displayed in bold/highlighted lines. Different icons associated with the connection line are used to indicate the type of the connection (TCP, UDP, etc.). Icons bedside the SDNA node are indicators of events or alerts, e.g. the infection of the node. When a user moves the mouse over active connection paths or indicator icons, a window will pop up to display the connection or events/alerts details.

Figure 18:
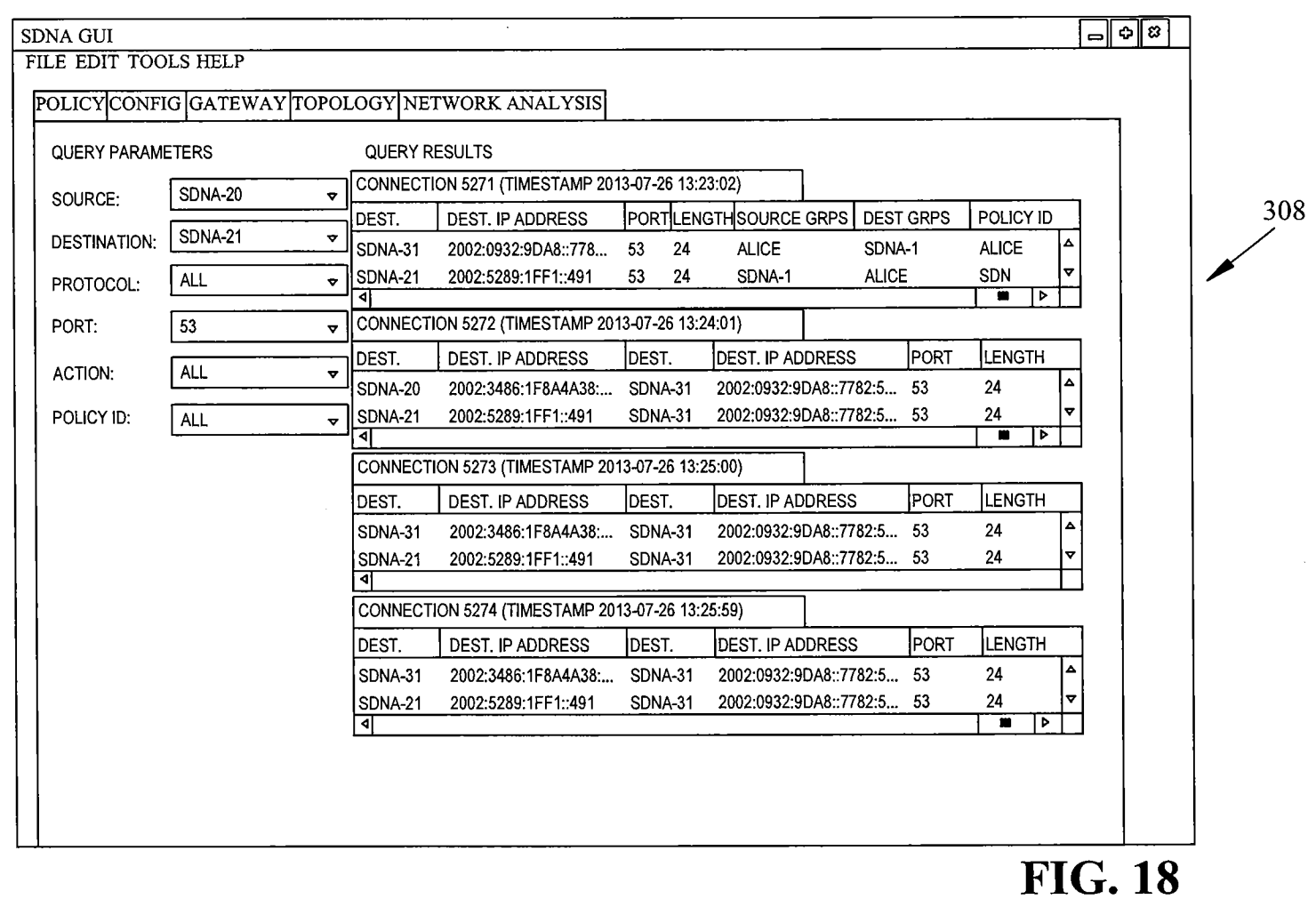

A representative screen shot is shown in FIG. 18 of a Network Analysis tab providing capabilities to execute structured queries on data stored in a database such as routes taken by packets through the SDNA network. The user provides specific filtering information, such as protocol type, source node, and/or destination node to limit the results returned from the database. The ACC uses the source and destination nodes from this query and reconstructs the route that the data took.

The primary focus of SDNA is obscuring the network topology within a single enclave. The Gateway node provides basic functionality for allowing out-bound connections from the enclave and in-bound connections to the enclave. However, there are complementary tools that can enhance the security of connections between SDNA enclaves (ARCSYNE) and can provide additional obscurity for the Gateway node (COSYNE).

Additionally, although the Administrator Control Center (ACC) GUI provides functionality for modifying the configuration of the SDNA enclave, there are complementary tools that can automatically permute the SDNA network configuration in a verifiably-correct manner (ADC), increasing the difficulty for attackers to determine the network organization.

ARCSYNE is designed to provide network address hopping during active TCP connections across a wide area network (WAN). This is accomplished by coordinating network address changes amongst the Communities of Interest (COIs) in the WAN.

In SDNA, for network traffic destined for a non-SDNA system, the enclave's Gateway node removes the SDNA dynamics that would cause packets to be un-routable on non-SDNA networks. However, if that network traffic is destined for a remote SDNA enclave and ARCSYNE is available, SDNA dynamics can be preserved by encapsulating the packet containing the SDNA dynamics and then routing the network traffic for the remote enclave through an ARCSYNE IPSec tunnel. The encapsulation prior to ARCSYNE preserves the SDNA dynamics but provides routable IP address for intervening non-SDNA networks.

To use ARCSYNE with SDNA, the ARCSYNE software is installed on a device adjacent to the Gateway node. The Gateway node encapsulates the packet first, and then sends it to ARCSYNE which establishes IPSec tunnels to each remote SDNA enclave using a "rendezvous" ARCSYNE node.

The use of ARSYNE's IPSec tunnels also extends to the key exchange messages. Without ARCSYNE, the local source SDNA node completes the key exchange process with the local SDNA Gateway node. However, with ARCSYNE, for the remote SDNA node to correctly validate the SDNA information on packets sent from the local source SDNA node, the local source SDNA node must also complete the key exchange process with the Gateway, Intermediate Node, and destination Gateway, Intermediate and Endpoint nodes in the remote enclave.

Figure 20:
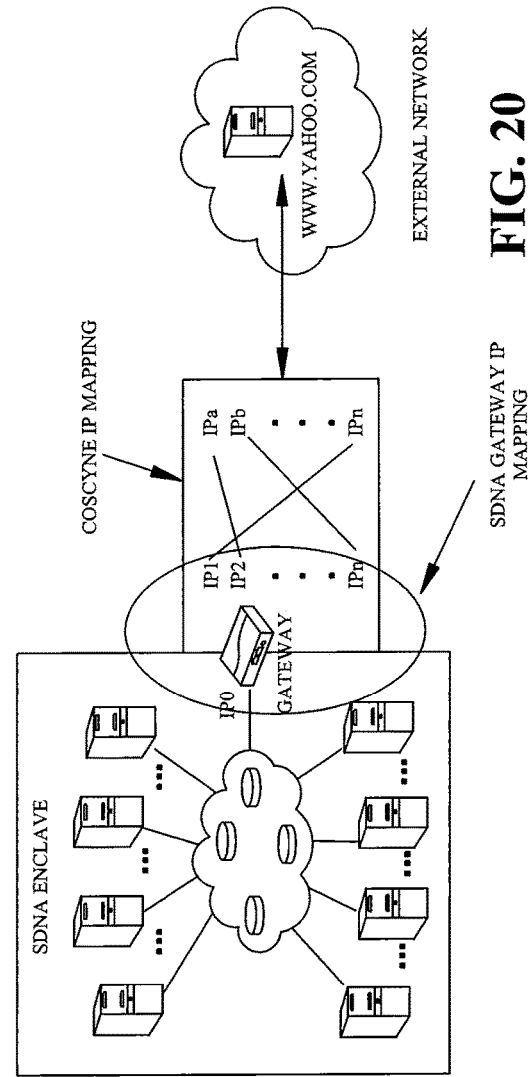
FIG. 20 is schematic diagram showing integration with COSYNE.

Referring to FIG. 20, COSYNE is designed to hide a system's location, origin, and identity as packets travel between a protected network enclave and an uncontrolled network (e.g. the Internet). COSYNE performs network and port address translation to mask the originating source IP address. Network traffic passes through a Gateway device running COSYNE and the traffic is manipulated at the packet level.

The SDNA Gateway node also provides a form of network address translation (as part of the process of removing the SDNA information and mapping connections to a public IP address), which effectively hides the identity of the originating SDNA Endpoint. However, the Gateway node does not endeavor to aggressively maximize the use of its public IP addresses as COSYNE is designed to do.

To use COSYNE with SDNA, the COSYNE software is installed on a device adjacent to the Gateway node. For an out-bound packet, the SDNA software first removes the SDNA information. Then, the COSYNE software performs its packet manipulations to change the source IP address using a second pool of IP addresses. For in-bound response packets, the COSYNE software first performs its manipulations to restore the original source IP address of the SDNA Gateway node. Then the SDNA software adds the appropriate SDNA information to allow the packet to route to its destination in the SDNA enclave.

ADC is designed to permute a network's configuration in a manner that is verifiably correct according to a set of system requirements for connectivity, security, performance, and reliability. The network administrator specifies the requirements as constraints on configuration variables, and ADC uses a constraint solver to determine the set of valid configurations. After the requirements are specified, ADC can verify that the current network configuration satisfies the requirements and generate new configurations to apply to the network.

The application of ADC to an SDNA network can be accomplished independently of any SDNA software. The network administrator first uses ADC to construct "correctness requirements" that describe the constraints for a valid SDNA network configuration. Using the Northbound Interface of each SDNA node, via the management port 4435, ADC queries the current configuration of the network. ADC uses the "correctness requirements" to validate that the current configuration satisfies the requirements for a valid SDNA network configuration. If any node configuration settings violate the "correctness requirements", ADC uses the Northbound Interface of that SDNA node to repair the configuration. Then, on a periodic basis as determined by the network administrator, ADC uses the Northbound Interface of each SDNA node to command new network configurations that still satisfy the "correctness requirements". The primary configuration settings that ADC might permute are node IP addresses and device policy assignments.

In addition to use for ADC and SDNA's ACC, the Northbound Interface is also suitable to receive control messages from other sources and to provide alerts and other logging information to IDSs and other data consumers implementing the interface.

SDNA allows user credentials to be securely provided to SDNA. This allows the credentials to be protected against a compromised Guest OS. User credentials are provided through normal OS means. When the authentication request is sent to the domain controller, SDNA begins to monitor in-bound traffic for the authentication response. If the domain controller validates the authentication request, SDNA uses the same user credentials and forwards the response to the Guest OS.

SDNA system provides easy ways to setup a new node to join the SDNA networks. Since two deployment scenarios are supported: hypervisor and embedded hardware based, there are two different ways to install and setup an SDNA node:

For hypervisor based SDNA node deployment, installation scripts and instructions are provided for XEN setup, SDNA deployment, and initial configuration. During installation, the network administrator is required to input a valid and unique node ID, the node type (Endpoint, Intermediate, or Gateway), and the hostname. After installation completes and the system is rebooted, initial setup scripts will assign the IP addresses for hypervisor OS according to the unique ID, provide an IP to the Guest OS via DHCP, set up and start the SDNA Entity.

For embedded hardware based node deployment, a range of node IDs is reserved. The firmware maintains a mapping of the default MAC address to node ID and type. When the system reboots for the first time, an initial configuration script will assign an ID and node type according to the map, and then assign the IP addresses to the embedded system according to the unique ID, and set up and start the SDNA Entity.

Once a node is installed and reboots, it can join the SDNA network and automatically register with ACC using the SDNA network. Afterwards, the ACC can configure, manage, and monitor its traffic. The ACC can further push data to or get data from the SDNA nodes via SDNA network. Since the registration is protected via an SSL connection, each host's key and the key of the CA used to sign them need to already be present on both the ACC and any SDNA node to be registered.

For both methods of using SDNA, a reset mechanism will be implemented to set the node back to the default configuration. If the reset is trigged, the SDNA device will boot up with its default configuration and require the administrator to perform initial configuration and enable the node to re-join the SDNA network.

While the invention has been taught with specific reference to these embodiments, one skilled in the art will recognize that changes can be made in form and detail without departing from the spirit and scope of the invention. Therefore, the described embodiments are to be considered, therefore, in all respects only as illustrative and not restrictive. As such, the scope of the invention is indicated by the following claims rather than by the description.

| Acronyms | |
|---|---|
| ACC | Administration Control Center |
| API | Application Programming Interface |
| ARCSYNE | Active Repositioning in Cyberspace for Synchronized Evasion |
| ARM | Advanced RISC Machines Ltd |
| CAC | Common Access Card |
| COI | Communities of Interest |
| CONOPS | Concept of Operations |
| COSYNE | Cyber Obfuscation System for Network Evasion |
| DNS | Domain Name System |
| GB | Giga Byte |
| GHz | Giga Hertz |
| GUI | Graphical User Interface |
| IAI | Intelligent Automation Inc. |
| ICMP | Internet Control Message Protocol |
| ID | Identifier |
| IDS | Intrusion Detection System |
| IP | Internet Protocol |
| IPSec | Internet Protocol Security |
| IPv4 | Internet Protocol Version 4 |
| IPv6 | Internet Protocol Version 6 |
| ISP | Internet Service Provider |

| Acronyms | |
|---|---|
| JSON | JavaScript Object Notation |
| MAC | Media Access Control |
| NTP | Network Time Protocol |
| OS | Operating System |
| PIN | Personal Identification Number |
| PKI | Public Key Infrastructure |
| RAM | Random Access Memory |
| RFC | Request For Comments |
| RIP | Routing Infounation Protocol |
| RIPng | Routing Information Protocol Next Generation |
| SDD | System Design Document |
| SDNA | Self-shielding Dynamic Network Architecture |
| SHA-2 | Secure Hash Algorithm - 2 |
| SSL | Secure Sockets Layer |
| TCP | Transmission Control Protocol |
| TCP SYN | TCP Synchronize |
| TTL | Time-to-Live |
| UDP | User Datagram Protocol |
| UTF-8 | UCS Transformation Format - 8-bit |
| VPN | Virtual Private Network |
| WAN | Wide Area Network |

The invention claimed is:

1. A method for self-shielding a dynamic network architecture system for preventing or reducing the impact of attacks thereon including the steps of:
modifying the manner in which network requests are performed using a process that makes re-routing invisible to a host machine, including assigning a customer non routable Internet Protocol for each user, at each session on each operating dynamic network architecture system;
automatically conveying identify across the dynamic network architecture system to determine an appropriate policy;
uniquely identifying a user and limiting an amount of network information the user is entitled to see;
enforcing devise and user specific policy based on ports, protocols, and destinations;
automatically encapsulating and de-encapsulating traffic as needed to support communication with non-protected systems and/or protocols not native to the dynamic network architecture system; and
automatically translating traffic as needed to support communication with non-protected systems and/or protocols not native to the dynamic network architecture system.

2. The method for self-shielding the dynamic network architecture system as set forth in claim 1, further including the step of using virtual addresses as exposed targets.

3. The method for self-shielding the dynamic network architecture system as set forth in claim 2, including the step of converting the virtual addresses to real Internet Protocol addresses with processing nodes.

4. The method for self-shielding the dynamic network architecture system as set forth in claim 3, wherein the processing nodes cannot be logged into or accessed by attackers and are transparent for real users.

5. The method for self-shielding the dynamic network architecture system as set forth in claim 4, including the step of controlling the processing nodes through a secure protocol in a control center of the dynamic network architecture system.

6. The method for self-shielding the dynamic network architecture system as set forth in claim 5, wherein packets sent by an attacker which do not correctly follow network dynamics stand out as unauthorized and allow intermediate blocking or alert generation.

7. The method for self-shielding the dynamic network architecture system as set forth in claim 6, wherein the dynamic network architecture system uses the ports and internet protocols in a redirection process guided by a hypervisor in the processing nodes.

8. The method for self-shielding the dynamic network architecture system as set forth in claim 7, wherein the dynamic network architecture system uses cryptographically imbedded states for network redirection inside larger Internet Protocol addresses.

9. A self-shielding dynamic network architecture system enclave for preventing or reducing the impact of attacks thereon including:
a dynamic network architecture system, and a host machine, the dynamic network architecture system configured to modify the manner in which network requests are performed using a process that makes re-routing invisible to the host machine, including assigning a custom non routable Internet Protocol for each user, at each session on each operating dynamic network architecture system, the dynamic network architecture system further configured to automatically convey identity to determine an appropriate policy and uniquely identifies a user and limits an amount of network information the user is entitled to see, and enforce device and user specific policy based on ports, protocols, and destinations; and
the dynamic network architecture system further configured to automatically encapsulate and de-encapsulate traffic as needed to support communication with non-protected systems and/or protocols not native to the dynamic network architecture system.

10. The self-shielding dynamic network architecture system enclave for preventing or reducing the impact of attacks thereon as set forth in claim 9 wherein, the dynamic network architecture system uses virtual addresses as exposed targets.

11. The self-shielding dynamic network architecture system enclave for preventing or reducing the impact of attacks thereon as set forth in claim 10 wherein, the dynamic network architecture system converts the virtual addresses to real Internet Protocol addresses using processing nodes.

12. The self-shielding dynamic network architecture system enclave for preventing or reducing the impact of attacks thereon as set forth in claim 11 wherein, the processing nodes cannot be logged into or accessed by attackers and are transparent for real users.

13. The self-shielding dynamic network architecture system enclave for preventing or reducing the impact of attacks thereon as set forth in claim 12 including, a control center of the dynamic network architecture system, the control center controlling the processing nodes through a secure protocol.

14. The self-shielding dynamic network architecture system enclave for preventing or reducing the impact of attacks thereon as set forth in claim 13 wherein, packets sent by an attacker which do not correctly follow network dynamics stand out as unauthorized and allow intermediate blocking or alert generation.

15. The self-shielding dynamic network architecture system enclave for preventing or reducing the impact of attacks thereon as set forth in claim 14 wherein, the dynamic network architecture system uses the ports and internet protocols in a redirection process guided by a hypervisor in the processing nodes.

16. The self-shielding dynamic network architecture system enclave for preventing or reducing the impact of attacks thereon as set forth in claim 15 wherein, the dynamic network architecture system uses cryptographically imbedded states for network redirection inside larger Internet Protocol addresses.

17. A self-shielding dynamic network architecture system enclave for preventing or reducing the impact of attacks thereon including:
- a dynamic network architecture system, and a host machine, the dynamic network architecture system configured to modify the manner in which a network requests are performed using a process that makes re-routing invisible to the host machine, including assigning a custom non routable Internet Protocol for each user, at each session on each operating dynamic network architecture system, the dynamic network architecture system further configured to automatically convey identity to determine an appropriate policy and uniquely identifies a user and limits an amount of network information the user is entitled to see, and enforce device and user specific policy based on ports, protocols, and destinations; and
- the dynamic network architecture system further configured to automatically translate traffic as needed to support communication with non-protected systems and/or protocols not native to the dynamic network architecture system.

\* \* \* \* \*